US012792889B2

(12) United States Patent
Mezghanni et al.

(10) Patent No.: US 12,792,889 B2
(45) Date of Patent: Nov. 10, 2026

(54) METHOD FOR TRAINING A DEEP-LEARNING GENERATIVE MODEL THAT OUTPUTS 3D MODELED OBJECTS

(71) Applicants: DASSAULT SYSTEMES, Velizy-Villacoublay (FR); ECOLE POLYTECHNIQUE, Palaiseau Cedex (FR); CNRS, Paris Cedex (FR)

(72) Inventors: Mariem Mezghanni, Velizy-Villacoublay (FR); Maks Ovsjanikov, Palaiseau Cedex (FR); Malika Boulkenafed, Velizy-Villacoublay (FR)

(73) Assignees: DASSAULT SYSTEMES, Velizy-Villacoublay (FR); ECOLE POLYTECHNIQUE, Palaiseau Cedex (FR); CNRS, Paris Cedex (FR)

( * ) Notice: Subject to any disclaimer, the term of this patent is extended or adjusted under 35 U.S.C. 154(b) by 1113 days.

(21) Appl. No.: 17/486,684

(22) Filed: Sep. 27, 2021

(65) Prior Publication Data

US 2022/0101105 A1 Mar. 31, 2022

(30) Foreign Application Priority Data

Sep. 25, 2020 (EP) .................................... 20306099

(51) Int. Cl.

*G06N 3/047* (2023.01)
*G06N 3/045* (2023.01)
*G06N 3/08* (2023.01)

(52) U.S. Cl.

CPC ............. *G06N 3/047* (2023.01); *G06N 3/045* (2023.01); *G06N 3/08* (2013.01)

(58) Field of Classification Search

CPC ........... G06N 3/047; G06N 3/045; G06N 3/08
See application file for complete search history.

(56) References Cited

U.S. PATENT DOCUMENTS

2007/0036434 A1* 2/2007 Saveliev ................ G06V 10/42 382/173
2010/0189320 A1* 7/2010 Dewaele ................... G06T 7/11 382/128

(Continued)

FOREIGN PATENT DOCUMENTS

JP 2020-115337 A 7/2020

OTHER PUBLICATIONS

Laga et al. (Geometry and Context for Semantic Correspondences and Functionality Recognition in Man-Made 3D Shapes, 2013, pp. 1-16) (Year: 2013).*

(Continued)

*Primary Examiner* — George Giroux

(74) *Attorney, Agent, or Firm* — Oblon, McClelland, Maier & Neustadt, L.L.P.

(57) ABSTRACT

A computer-implemented method for training a deep-learning generative model configured to output 3D modeled objects each representing a mechanical part or an assembly of mechanical parts. The method comprises obtaining a dataset of 3D modeled objects and training the deep-learning generative model based on the dataset. The training includes minimization of a loss. The loss includes a term that penalizes, for each output respective 3D modeled object, one or more functional scores of the respective 3D modeled object. Each functional score measures an extent of non-respect of a respective functional descriptor among one or more functional descriptors, by the mechanical part or the assembly of mechanical parts. This forms an improved solution with respect to outputting 3D modeled objects each representing a mechanical part or an assembly of mechanical parts.

11 Claims, 10 Drawing Sheets

(56) References Cited

U.S. PATENT DOCUMENTS

| | | | | |
|---|---|---|---|---|
| 2018/0314917 | A1* | 11/2018 | Mehr | G06F 30/00 |
| 2020/0294309 | A1 | 9/2020 | Kong et al. | |
| 2021/0049811 | A1* | 2/2021 | Fedyukov | G06T 7/60 |
| 2022/0058822 | A1* | 2/2022 | Naruniec | G06N 5/04 |

OTHER PUBLICATIONS

Hassanin et al. (A New Localization Objective for Accurate Fine-Grained Affordance Segmentation Under High-Scale Variations, Feb. 2020, pp. 28123-28132) (Year: 2020).*

Ibragimov et al. (Shape Representation for Efficient Landmark-Based Segmentation in 3-D, Apr. 2014, pp. 861-874) (Year: 2014).*

Grabner et al. (What Makes a Chair a Chair?, Jun. 2011, pp. 1529-1536) (Year: 2011).*

Bikas et al. (Additive manufacturing methods and modelling approaches: a critical review, Jul. 2015, pp. 389-405) (Year: 2015).*

Hao Wang, et al.; "Global-to-Local Generative Model for 3D Shapes"; ACM Trans. Graph.: vol. 37, No. 6: Article 214; Publication Date: Nov. 2018: SIGGRAPH Asia: 10 pgs.

Ervin Coumans, et al.; "PyBullet, a Phyton Module for Physics Simulation for Games. Robotics and Machine Learning"; pybullet.org; 2016-2019; 75 pgs.

C. Nash, et al.; The Shape Variational Autoencoder: A Deep Generative Model for Part-Segmented 3D Objects; Eurographics Symposium on Geometry Processing; Jul. 2017: vol. 36, No. 5; 11 pgs.

Jul Li, et al.; "GRASS: Generative Recursive Autoencoders for Shape Structures"; ACM Transaction on Graphics; vol. 36. No. 34, Article 52; Jul. 2017: 14 pgs.

Zhiqin Chen, et al.: "Learning Implicit Fields for Generative Shape Modeling": CVPR; 2019; 10 pgs.

Charles R. Qi, et al.; "PaintNet: Deep Learning on Point Sets for 3D Classification and Segmentation"; CVPR: 2017; 9 pgs.

Rundi Wu, et al.; PQ-NET: A Generative Part Seq2Seq Network for 3D Shapes; Abstract Only; CVPR: 2020; 2 pgs.

Kaichun Mo, et al.: "StructureNet: Hierarchical Graph Networks for 3D Shape Generation": ACM Trans, Graph.; vol. 38, No. 6, Article 242; Nov. 2019; 19 pgs.

Richard Brüel-Gabrielsson, et al.; "A Topology Layer for Machine Learning": arXiv:1905.12200v2 [cs.LG]: Proceedings of the 23rd International Conference on Artificial Intelligence and Statistics (AISTATS): vol. 108: Apr. 24, 2020; 13 pgs.

Siddhartha Chauduri, et al.; "Learning Generative Models of 3D Structures": Eurographics 2020; vol. 39, No. 2; 24 pgs.

Niloy J. Mitra, et al.; "Structure-Aware Shape Processing"; Eurographics 13; 2013; 22 pgs.

Jiajun Wu, et al.; "Learning a Probabilistic Latent Space of Object Shapes via 3D Generative-Adversarial Modeling": $30^{th}$ Conference on Neural Information Processing Systems (NIPS 2016): 2016, Barcelona, Spain, 9 pgs.

Wayne Carlson: "An Algorithm and Data Structure for 3D Object Synthesis Using Surface Patch Intersections"; ACM SIGGRAPH Computer Graphics, vol. 16, Issue 3; Jul. 1982; Abstract Only; 4 pgs.

Johan W.H. Tangelder, et al.: "A Survey of Content Based 3D Shape Retrieval Methods", Multimedia Tools and Applications: 2008; 12 pgs.

Oliver Van Kaick, et al.; "A Survey on Shape Correspondence", Computer Graphics Forum: 2011: 24 pgs.

Extended Search Report issued April 6. 2021 in Europe Patent Application No. 20306099.1-1203: 11 pgs.

Wei Chen, et al.: "Mo-Padgan: Reparameterizing Engineering Designs for Augmented Multi-Objective Optimization"; arxiv.org, Cornell University Library. Olin Library Cornell University Ithaca, NY 14853; Sep. 15. 2020; XP081763556; 13 pgs.

Jyh-Jing Hwang, et al.; "Learning Beyond Human Expertise with Generative Models for Dental Restorations": arxiv.org. Cornell University Library, Olin Library Cornell University Ithaca, NY 14853; Mar. 30, 2018; 18 pgs.

Elena Balashova, et al.; "Structure-Aware Shape Synthesis": 2018 International Conference on 3D Vision (3DV). IEEE; Sep. 5, 2018; 10 pgs.

Office Action Jul. 15, 2025, issued in counterpart JP Application No. 2021-156903, with English Translation. (9 pages).

Balashova et al., "Structure-Aware Shape Synthesis", International Conference on 3D Vision, 2018, 17 pages (with supplementary material).

Combined Chinese Office Action and Search Report issued on Apr. 21, 2026 in Chinese Patent Application No. 202111119857.1 (with unedited computer-generated English translation), 27 pages.

* cited by examiner

| Object category | Functional Descriptors | Functional score computation tool example |
|---|---|---|
| Chair | Connectivity | Topological loss |
| | Physical stability | Physical simulation (apply gravity force) |
| | Sitting affordance | Physical simulation(apply forces on seat/back and evaluate human posture [10]) |
| Table | Connectivity | Topological loss |
| | Physical stability | Physical simulation (apply gravity force) |
| | Object support | Physical simulation (apply force on the object top) |
| Airplane | Connectivity | Topological loss |
| | Drag coefficients | Computational Fluid Dynamics (CFD) simulation [11] |
| Bed | Connectivity | Topological loss |
| | Physical stability | Physical simulation (apply gravity force) |
| | Human support | Physical simulation (apply force on the object top) |
| Push cart | Connectivity | Topological loss |
| | Physical stability | Physical simulation (apply gravity force) |
| | Containing | Physical simulation [12] |
| | Rolling | Topological loss on wheels |
| | Human pushing | Physical simulation (apply pushing forces on cart grip) |
| Bicycle | Connectivity | Topological loss |
| | Human support | Physical simulation (apply forces on seat and human posture[13]) |
| | Pedal affordance | Physical simulation (simulate pedaling effects) |

FIG. 4

| Object id | Input functional score | Output functional score | $\|z_{out} - z_{in}\|_2$ |
|---|---|---|---|
| 1 | 0.9641 | 0.0114 | 0.00145 |
| 2 | 0.9957 | 0.0081 | 0.00026 |
| 3 | 0.9994 | 0.0756 | 0.00080 |
| 4 | 0.8797 | 0.0596 | 0.00092 |

METHOD FOR TRAINING A DEEP-LEARNING GENERATIVE MODEL THAT OUTPUTS 3D MODELED OBJECTS

CROSS-REFERENCE TO RELATED APPLICATIONS

This application claims priority under 35 U.S.C. § 119 or 365 to European Application No. 20306099.1, filed Sep. 25, 2020. The entire contents of the above application(s) are incorporated herein by reference.

FIELD OF THE DISCLOSURE

The disclosure relates to the field of computer programs and systems, and more specifically to methods, devices and programs pertaining to a deep-learning generative model that outputs 3D modeled objects each representing a mechanical part or an assembly of mechanical parts.

BACKGROUND

A number of systems and programs are offered on the market for the design, the engineering and the manufacturing of objects. CAD is an acronym for Computer-Aided Design, e.g., it relates to software solutions for designing an object. CAE is an acronym for Computer-Aided Engineering, e.g., it relates to software solutions for simulating the physical behavior of a future product. CAM is an acronym for Computer-Aided Manufacturing, e.g., it relates to software solutions for defining manufacturing processes and operations. In such computer-aided design systems, the graphical user interface plays an important role as regards the efficiency of the technique. These techniques may be embedded within Product Lifecycle Management (PLM) systems. PLM refers to a business strategy that helps companies to share product data, apply common processes, and leverage corporate knowledge for the development of products from conception to the end of their life, across the concept of extended enterprise. The PLM solutions provided by Dassault Systémes (under the trademarks CATIA, ENOVIA and DELMIA) provide an Engineering Hub, which organizes product engineering knowledge, a Manufacturing Hub, which manages manufacturing engineering knowledge, and an Enterprise Hub which enables enterprise integrations and connections into both the Engineering and Manufacturing Hubs. All together the system delivers an open object model linking products, processes, resources to enable dynamic, knowledge-based product creation and decision support that drives optimized product definition, manufacturing preparation, production and service.

In this context and other contexts, deep-learning and in particular deep-learning generative models of 3D modeled objects are gaining wide importance.

The following papers relate to this field and are referred to hereunder:

[1] Oliver Van Kaick, Hao Zhang, Ghassan Hamarneh, and Daniel Cohen-Or. *A survey on shape correspondence*. CGF, 2011.

[2] Johan W H Tangelder and Remco C Veltkamp. *A survey of content based 3d shape retrieval methods*. Multimedia tools and applications, 39(3): 441-471, 2008.

[3] Wayne E Carlson. *An algorithm and data structure for 3d object synthesis using surface patch intersections*. In SIGGRAPH, 1982.

[4] J. Wu, C. Zhang, T. Xue, W. T. Freeman, J. B. Tenenbaum. *Learning a Probabilistic Latent Space of Object Shapes via 3D Generative-Adversarial Modeling,* 2016.

[5] Siddhartha Chaudhuri, Daniel Ritchie, Jiajun Wu, Kai Xu, Hao Zhang. *Learning Generative Models of 3D Structures*. EUROGRAPHICS 2020.

[6] R. B. Gabrielsson, V. Ganapathi-Subramanian, P. Skraba, and L. J. Guibas. *Topology-Layer for Machine Learning,* 2019.

[7] Erwin Coumans and Yunfei Bai. Pybullet. *A python module for physics simulation for games, robotics and machine learning.* http://pybullet.org, 2016-2019.

[8] Rundi Wu, Yixin Zhuang, Kai Xu Hao Zhang, Baoquan Chen. PQ-NET: *A Generative Part Seq2Seq Network for 3D Shapes*. CVPR 2020.

[9] Qi, C. R., Su, H., Mo, K., & Guibas, L. J. *PointNet: Deep learning on point sets for 3D classification and segmentation*. CVPR, 2017.

Papers [1,2,3] relate to methods to retrieve and synthesize new shapes by borrowing and combining parts from an existing patrimony (e.g., dataset) of 3D objects. Generative methods have demonstrated their potential to synthesize 3D modeled objects (i.e., to come up with a new content that goes beyond combining and retrieving existing patrimony), thereby proposing conceptually novel objects. Prior art-generative methods learn and apply generative models of 3D content [4,5], focusing only on either geometric or structural features of 3D modeled objects. Paper [4] introduces a model which is a generative decoder that maps noise samples (e.g., uniform or Gaussian) to a voxel grid as output whose distribution is close to that of the data generating distribution. Paper [5] surveys learning 3D generative models that are aware of the structure of the data, e.g., the arrangement and relations between parts of the shape of the 3D modeled object.

However, there is still a need for improved solutions with respect to outputting 3D modeled objects each representing a mechanical part or an assembly of mechanical parts.

SUMMARY

It is therefore provided a computer-implemented method for training a deep-learning generative model that outputs 3D modeled objects each representing a mechanical part or an assembly of mechanical parts. The training method comprises providing a dataset of 3D modeled objects. Each 3D modeled object represents a mechanical part or an assembly of mechanical parts. The training method further comprises training the deep-learning generative model based on the dataset. The training of the deep-learning generative model includes minimization of a loss. The loss includes a term that penalizes, for each output respective 3D modeled object, one or more functional scores of the respective 3D modeled object. Each functional score measures an extent of non-respect of a respective functional descriptor among one or more functional descriptors, by the mechanical part or the assembly of mechanical parts.

The training method may comprise one or more of the following:

- The loss further includes another term that penalizes, for each output respective 3D modeled object, a shape inconsistency of the respective 3D modeled object with respect to the dataset.
- The other term includes:
  - a reconstruction loss between the respective 3D modeled object and a corresponding ground truth 3D modeled object of the dataset;

an adversarial loss relative to the dataset; or
a mapping distance measuring a shape dissimilarity between the respective 3D modeled object and a corresponding modeled object of the dataset.

The deep-learning generative model includes a 3D generative neural network.

The 3D generative neural network includes a Variational Autoencoder or a Generative Adversarial Network.

The deep-learning generative model consists in one of:
the 3D generative neural network, wherein the 3D generative model includes a Variational Autoencoder, the other term including the reconstruction loss and a variational loss;
the 3D generative neural network, wherein the 3D generative model includes a Generative Adversarial Network, the other term including the adversarial loss; or
a mapping model followed by the 3D generative neural network, the 3D generative neural network being pre-trained, the other term including the mapping distance, the 3D generative neural network optionally including a Variational Autoencoder or a Generative Adversarial Network.

The training comprises computing, for each respective 3D modeled object, a functional score of the 3D modeled object, the computing being performed by applying to the 3D modeled object one or more among:
a deterministic function;
a simulation-based engine; or
a deep-learning function.

The computing is performed by the deep-learning function, the deep-learning function having been trained on the basis of another dataset, respective functional score, the respective functional score having been computed by using one or more among:
a deterministic function;
a simulation-based engine; or
a deep-learning function.

The one or more functional descriptors include a connectivity descriptor.

The one or more functional descriptors include:
one or more geometrical descriptors; and/or
one or more affordances.

The one or more geometrical descriptors include:
a physical stability descriptor, the physical stability descriptor represents, for a mechanical part or an assembly of mechanical parts, a stability of the mechanical part or the assembly of mechanical parts under the application of gravity force only; and/or
a durability descriptor, the durability descriptor represents, for a mechanical part or an assembly of mechanical parts, a capability of the mechanical part or the assembly of mechanical parts to withstand the application of gravity force and external mechanical forces.

The one or more affordances include:
a support affordance descriptor, the support affordance descriptor represents, for a mechanical part or an assembly of mechanical parts, a capability of the mechanical part or the assembly of mechanical parts to withstand the application of external mechanical forces only; and/or
a drag coefficient descriptor, the drag coefficient descriptor represents, for a mechanical part or an assembly of mechanical parts, an influence of a fluid environment on the mechanical part or the assembly of mechanical parts;
a contain affordance descriptor, the contain affordance descriptor represents, for a mechanical part or an assembly of mechanical parts, a capability of the mechanical part or the assembly of mechanical parts to contain another object in an inside volume of the mechanical part;
a holding affordance descriptor, the holding affordance descriptor represents, for a mechanical part or an assembly of mechanical parts, a capability of the mechanical part or the assembly of mechanical parts to support another object via a mechanical connection; and/or
a hanging affordance descriptor, the hanging affordance descriptor represents, for a mechanical part or an assembly of mechanical parts, a capability of the mechanical part or the assembly of mechanical parts to be supported through a mechanical connection.

Each 3D modeled object of the dataset represents:
a piece of furniture;
a motorized vehicle;
a non-motorized vehicle; or
a tool.

It is further provided a method of use of a deep-learning generative model that outputs 3D modeled objects each representing a mechanical part or an assembly of mechanical parts, and trained (i.e., having been trained) according to the training method. The method of use comprises providing the deep-learning generative model and applying the deep-learning generative model to output one or more 3D modeled objects each representing a respective mechanical part or an assembly of mechanical parts.

It is further provided a machine-learning process comprising the training method, and then the method of use.

It is further provided a computer program comprising instructions for performing the training method, the method of use, and/or the machine-learning process.

It is further provided a device comprising a data storage medium having recorded thereon the program and/or the trained deep-learning generative model.

The device may form a non-transitory computer-readable medium. The device may alternatively comprise a processor coupled to the data storage medium. The device may thus form a system. The system may further comprise a graphical user interface coupled to the processor.

BRIEF DESCRIPTION OF THE DRAWINGS

Embodiments of the disclosure will now be described, by way of non-limiting example, and in reference to the accompanying drawings, where:

FIGS. 4, 5, 6, 7, 8, 9, 10, 11, 12, 13, 14, 15 and 16 illustrate the training method, the method of use, and/or the machine-learning process.

DETAILED DESCRIPTION

Figure 1:
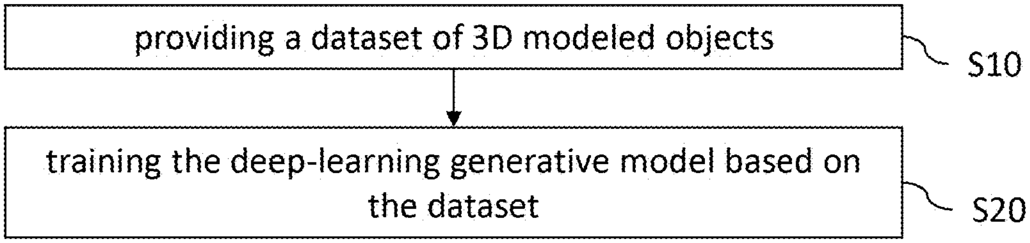
FIG. 1 shows a flowchart of the training method.

Referring to FIG. 1, it is provided a computer-implemented method for training a deep-learning generative model. The deep-learning generative model is configured to output 3D modeled objects. Each 3D modeled object represents a mechanical part or an assembly of mechanical parts. The training method comprises providing S10 a dataset of 3D modeled objects. Each 3D modeled object of the dataset represents a mechanical part or an assembly of mechanical parts. The training method further comprises training S20 the deep-learning generative model based on the dataset. The training S20 includes minimization of a loss. The loss includes a term that penalizes, for each output respective 3D modeled object, one or more functional scores of the respective 3D modeled object. Each functional score measures an extent of non-respect of a respective functional descriptor among one or more functional descriptors, by the mechanical part or the assembly of mechanical parts.

The training method constitutes an improved solution with respect to outputting 3D modeled objects each representing a mechanical part or an assembly of mechanical parts.

Notably, the training method allows obtaining a generative model configured to output 3D modeled objects. The generative model allows generating (i.e., outputting or synthesizing) one or more 3D modeled objects automatically, thus improving ergonomics in the field of 3D modeling. Moreover, the training method obtains the generative model via a training S20 based on the dataset provided at S10, and the generative model is a deep-learning generative model. Thus, the training method leverages on improvements provided by the field of machine-learning. In particular, the deep-learning generative model may learn to replicate the data distribution of a diversity of 3D modeled objects present in the dataset and output 3D modeled objects based on the learning.

In addition, the deep-learning generative model outputs particularly accurate 3D modeled objects, in terms of use or purpose characteristics of the represented mechanical part or assembly of mechanical parts in the real world, within an intended context. This is thanks to the training S20 including minimization of a particular loss. The loss includes in specific a term that penalizes, for each output respective 3D modeled object, one or more functional scores of the respective 3D modeled object. With this specific term included in the loss, the deep-learning generative model is taught to output a 3D object that fulfills a functional validity that is measured by the one or more functional scores. Indeed, each functional score measures an extent of non-respect of a respective functional descriptor among one or more functional descriptors, by the mechanical part or the assembly of mechanical parts. In examples, such functional descriptors may involve any cue related to shape, structure, or any type of interaction of the represented mechanical part or assembly of mechanical parts with other objects or mechanical forces within the intended context. Therefore, the learning S20 may evaluate the functional validity of the 3D modeled objects of the dataset in the intended context, for example, in terms of shape or structural soundness, physical realizability and interaction quality in the intended context. Thus, the deep learning generative model outputs particularly accurate 3D modeled objects that are functionally valid.

In addition, the training S20 may explore the functional features of 3D modeled objects of the dataset. In examples, in addition to geometric and structural features of said 3D objects, the training S20 may explore the mutual dependencies between geometric, structural, topological and physical features of said 3D objects. Moreover, the training S20 may be used for outputting 3D modeled objects that refine or correct the functionality of respective 3D modeled objects of the dataset, thereby improving the accuracy of the output 3D modeled objects with respect to the dataset.

Any method herein is computer-implemented. This means that all steps of the training method (including S10 and S20) and all steps of the method of use are executed by at least one computer, or any system alike. Thus, steps of the method are performed by the computer, possibly fully automatically, or, semi-automatically. In examples, the triggering of at least some of the steps of the method may be performed through user-computer interaction. The level of user-computer interaction required may depend on the level of automatism foreseen and put in balance with the need to implement user's wishes. In examples, this level may be user-defined and/or pre-defined.

A typical example of computer-implementation of a method herein is to perform the method with a system adapted for this purpose. The system may comprise a processor coupled to a memory and a graphical user interface (GUI), the memory having recorded thereon a computer program comprising instructions for performing the method. The memory may also store a database. The memory is any hardware adapted for such storage, possibly comprising several physical distinct parts (e.g., one for the program, and possibly one for the database).

A modeled object is any object defined by data stored e.g. in the database. By extension, the expression "modeled object" designates the data itself. According to the type of the system, the modeled objects may be defined by different kinds of data. The system may indeed be any combination of a CAD system, a CAM system, a PDM system and/or a PLM system. In those different systems, modeled objects are defined by corresponding data. One may accordingly speak of CAD object, PLM object, PDM object, CAE object, CAM object, CAD data, PLM data, PDM data, CAM data, CAE data. However, these systems are not exclusive one of the other, as a modeled object may be defined by data corresponding to any combination of these systems. A system may thus well be both a CAD and PLM system.

By CAD system, it is additionally meant any system adapted at least for designing a modeled object on the basis of a graphical representation of the modeled object, such as CATIA. In this case, the data defining a modeled object comprise data allowing the representation of the modeled object. A CAD system may for example provide a representation of CAD modeled objects using edges or lines, in certain cases with faces or surfaces. Specifications of a modeled object may be stored in a single CAD file or multiple ones. The typical size of a file representing a modeled object in a CAD system is in the range of one Megabyte per part. A modeled object may typically be an assembly of thousands of parts.

In the context of CAD, a modeled object may typically be a 3D modeled object. By "3D modeled object", it is meant any object which is modeled by data allowing its 3D representation. A 3D representation allows the viewing of the part from all angles. For example, a 3D modeled object, when 3D represented, may be handled and turned around any of its axes, or around any axis in the screen on which the representation is displayed.

Any 3D modeled object herein, including any 3D modeled object output by the deep learning generative model, may represent the geometry of a product to be manufactured in the real world such as a (e.g. mechanical) part or assembly of parts (or equivalently an assembly of parts, as the assembly of parts may be seen as a part itself from the point of view of the training method, or the training method may be applied independently to each part of the assembly), or more generally any rigid body assembly (e.g. a mobile mechanism). Any of said 3D modeled objects may thus represent an industrial product which may be any mechanical part, such as a part of a motorized or non-motorized terrestrial vehicle (including e.g. car and light truck equipment, racing cars, motorcycles, truck and motor equipment, trucks and buses, trains), a part of an aerial vehicle (including e.g. airframe equipment, aerospace equipment, propulsion equipment, defense products, airline equipment, space equipment), a part of a naval vehicle (including e.g. navy equipment, commercial ships, offshore equipment, yachts and workboats, marine equipment), a general mechanical part (including e.g. industrial manufacturing machinery, heavy mobile machinery or equipment, installed equipment, industrial equipment product, fabricated metal product, tire manufacturing product), an electro-mechanical or electronic part (including e.g. consumer electronics, security and/or control and/or instrumentation products, computing and communication equipment, semiconductors, medical devices and equipment), a consumer good (including e.g. furniture, home and garden products, leisure goods, fashion products, hard goods retailers' products, soft goods retailers' products), a packaging (including e.g. food and beverage and tobacco, beauty and personal care, household product packaging). Any of said 3D modeled objects, including any 3D modeled object output by the deep learning generative model, may be subsequently integrated as part of a virtual design with for instance a CAD software solution or CAD system. A CAD software solution allows the subsequent design of products in various and unlimited industrial fields, including: aerospace, architecture, construction, consumer goods, high-tech devices, industrial equipment, transportation, marine, and/or offshore oil/gas production or transportation.

By PLM system, it is additionally meant any system adapted for the management of a modeled object representing a physical manufactured product (or product to be manufactured). In a PLM system, a modeled object is thus defined by data suitable for the manufacturing of a physical object. These may typically be dimension values and/or tolerance values. For a correct manufacturing of an object, it is indeed better to have such values.

By CAM solution, it is additionally meant any solution, software of hardware, adapted for managing the manufacturing data of a product. The manufacturing data generally includes data related to the product to manufacture, the manufacturing process and the required resources. A CAM solution is used to plan and optimize the whole manufacturing process of a product. For instance, it can provide the CAM users with information on the feasibility, the duration of a manufacturing process or the number of resources, such as specific robots, that may be used at a specific step of the manufacturing process; and thus allowing decision on management or required investment. CAM is a subsequent process after a CAD process and potential CAE process. Such CAM solutions are provided by Dassault Systémes under the trademark DELMIA®.

Figure 2:
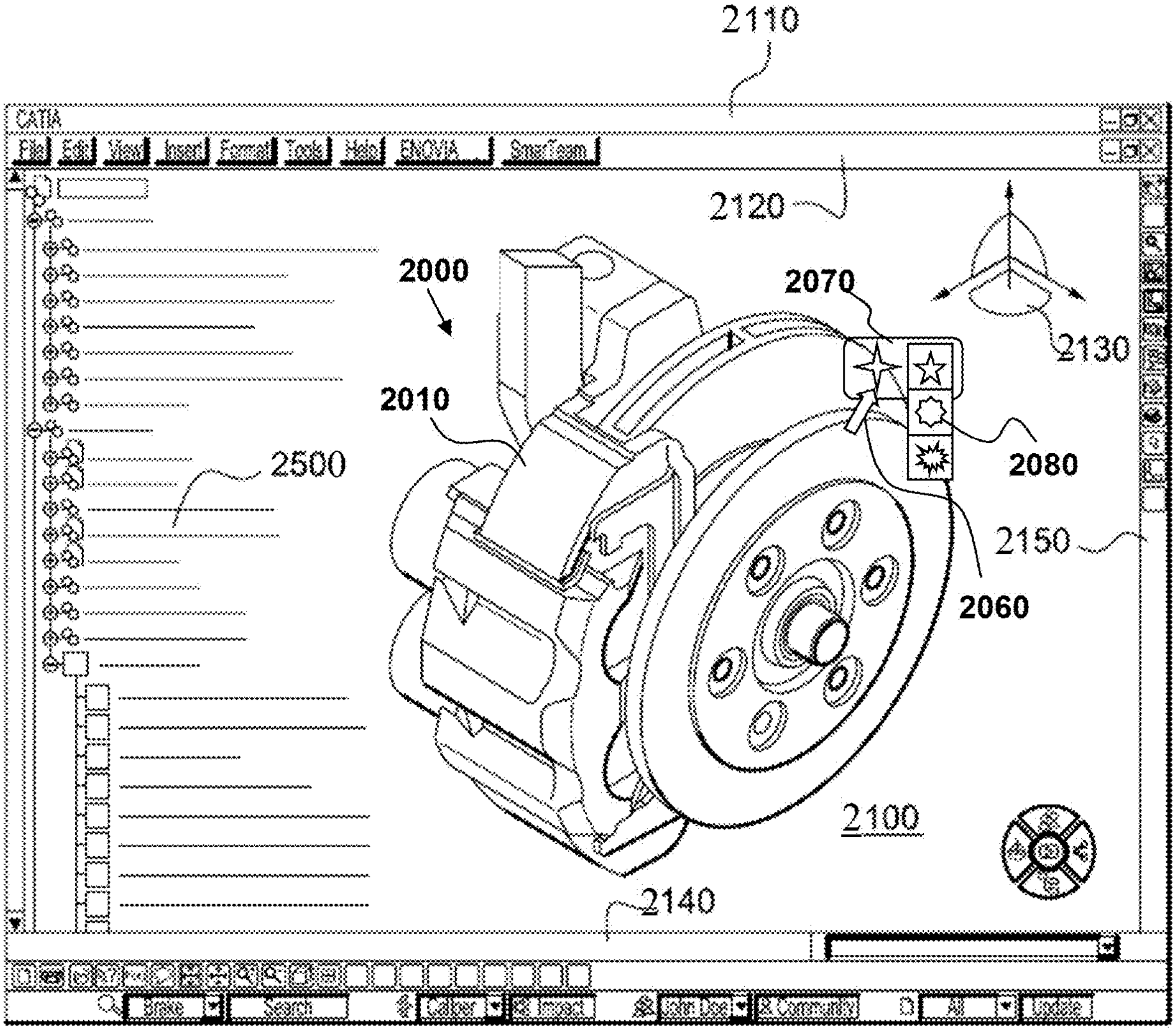
FIG. 2 shows an example of a graphical user interface of the system.

FIG. 2 shows an example of the GUI of the system, wherein the system is a CAD system which may be used for displaying and/or designing (e.g., editing) any 3D modeled object output by the deep learning generative model and that has been integrated as part of the virtual design.

The GUI 2100 may be a typical CAD-like interface, having standard menu bars 2110, 2120, as well as bottom and side toolbars 2140, 2150. Such menu- and toolbars contain a set of user-selectable icons, each icon being associated with one or more operations or functions, as known in the art. Some of these icons are associated with software tools, adapted for editing and/or working on the 3D modeled object 2000 displayed in the GUI 2100. The software tools may be grouped into workbenches. Each workbench comprises a subset of software tools. In particular, one of the workbenches is an edition workbench, suitable for editing geometrical features of the modeled product 2000. In operation, a designer may for example pre-select a part of the object 2000 and then initiate an operation (e.g. change the dimension, color, etc.) or edit geometrical constraints by selecting an appropriate icon. For example, typical CAD operations are the modeling of the punching or the folding of the 3D modeled object displayed on the screen. The GUI may for example display data 2500 related to the displayed product 2000. In the example of the figure, the data 2500, displayed as a "feature tree", and their 3D representation 2000 pertain to a brake assembly including brake caliper and disc. The GUI may further show various types of graphic tools 2130, 2070, 2080 for example for facilitating 3D orientation of the object, for triggering a simulation of an operation of an edited product or render various attributes of the displayed product 2000. A cursor 2060 may be controlled by a haptic device to allow the user to interact with the graphic tools.

Figure 3:
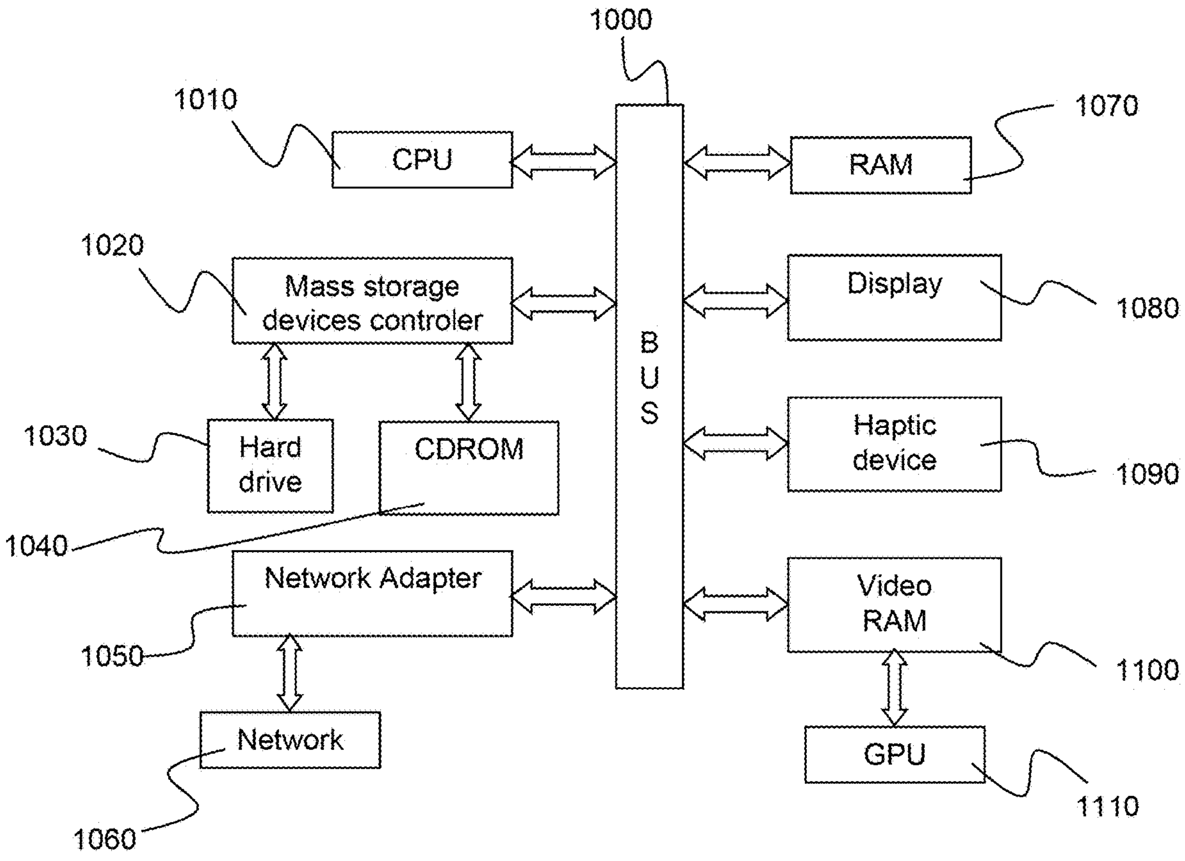
FIG. 3 shows an example of the system.

FIG. 3 shows an example of the system, wherein the system is a client computer system, e.g., a workstation of a user.

The client computer of the example comprises a central processing unit (CPU) 1010 connected to an internal communication BUS 1000, a random access memory (RAM) 1070 also connected to the BUS. The client computer is further provided with a graphical processing unit (GPU) 1110 which is associated with a video random access memory 1100 connected to the BUS. Video RAM 1100 is also known in the art as frame buffer. A mass storage device controller 1020 manages accesses to a mass memory device, such as hard drive 1030. Mass memory devices suitable for tangibly embodying computer program instructions and data include all forms of nonvolatile memory, including by way of example semiconductor memory devices, such as EPROM, EEPROM, and flash memory devices; magnetic disks such as internal hard disks and removable disks; magneto-optical disks; and CD-ROM disks 1040. Any of the foregoing may be supplemented by, or incorporated in, specially designed ASICs (application-specific integrated circuits). A network adapter 1050 manages accesses to a network 1060. The client computer may also include a haptic device 1090 such as cursor control device, a keyboard or the like. A cursor control device is used in the client computer to permit the user to selectively position a cursor at any desired location on display 1080. In addition, the cursor control device allows the user to select various commands, and input control signals. The cursor control device includes a number of signal generation devices for input control signals to system. Typically, a cursor control device may be a mouse, the button of the mouse being used to generate the signals. Alternatively or additionally, the client computer system may comprise a sensitive pad, and/or a sensitive screen.

The computer program may comprise instructions executable by a computer, the instructions comprising means for causing the above system to perform any of the methods. The program may be recordable on any data storage medium, including the memory of the system. The program may for example be implemented in digital electronic circuitry, or in computer hardware, firmware, software, or in combinations of them. The program may be implemented as an apparatus, for example a product tangibly embodied in a machine-readable storage device for execution by a programmable processor. Method steps may be performed by a programmable processor executing a program of instructions to perform functions of the method by operating on input data and generating output. The processor may thus be programmable and coupled to receive data and instructions from, and to transmit data and instructions to, a data storage system, at least one input device, and at least one output device. The application program may be implemented in a high-level procedural or object-oriented programming language, or in assembly or machine language if desired. In any case, the language may be a compiled or interpreted language. The program may be a full installation program or an update program. Application of the program on the system results in any case in instructions for performing any method herein.

The deep learning generative model trained according to the training method may be part of a process for designing a 3D modeled object. "Designing a 3D modeled object" designates any action or series of actions which is at least part of a process of elaborating a 3D modeled object. For example, the process may comprise applying the deep-learning generative model to output one or more 3D modeled objects, and optionally performing one or more design modifications to each respective output 3D modeled object. The process may comprise displaying a graphical representation of each respective output 3D modeled object, and the optional one or more design modifications may comprise applying CAD operations with a CAD software, for example by user-graphical interaction.

The designing may comprise using the deep learning generative model trained according to the training method for creating the 3D modeled object from scratch, thus improving the ergonomics of the design process. Indeed, the user does not need to use cumbersome tools to create from scratch the 3D modeled object and may concentrate on other tasks in the design process. Alternatively, the designing may comprise providing a 3D modeled object (having been previously created) to the deep learning generative model trained according to the training method. The deep-learning generative model may map the input modeled object to an output 3D modeled object and the subsequent design is performed on said output 3D modeled object of the deep learning generative model. The output 3D modeled object is more accurate relative than the input 3D modeled object, in terms of functionality. In other words, the deep-learning generative model may be used to correct or improve/optimize an input 3D modeled objects, functionally speaking, yielding an improved design process. The input 3D modeled object may be geometrically realistic, but yet functionally invalid or unoptimized. The method of use in that case may remedy this.

The design process may be included in a manufacturing process, which may comprise, after performing the design process, producing a physical product corresponding to the modeled object. In any case, the modeled object designed by the method may represent a manufacturing object. The modeled object may thus be a modeled solid (i.e., a modeled object that represents a solid). The manufacturing object may be a product, such as a part, or an assembly of parts. Because the deep learning generative model improves the design process of elaborating the modeled object, the deep learning generative model also improves the manufacturing of a product and thus increases productivity of the manufacturing process.

By "deep-learning model", it is meant any data structure that represents a series of computations, wherein at least a part of said data structure can be trained based on a dataset of 3D modeled objects. The training can be performed by means of any set of techniques known from the field of machine learning, notably within the field of deep-learning. The trained deep learning model, i.e., having been trained based on the dataset of 3D modeled objects, is "generative", i.e., configured to generate and output one or more 3D objects. In examples, the deep-learning generative model may include a Variational Auto Encoder or a Generative Adversarial Network, and/or any other Neural Network (e.g., Convolutional Neural Network, Recurrent Neural Network, Discriminative Models). In such examples, the deep-learning generative model may generate a family of synthesized 3D objects, with at least some degree of accuracy with respect to geometrical shape.

The minimization of the loss may be performed in any way, e.g., gradient descent, or any other minimization known within the field. The loss includes a term that penalizes, for each output respective 3D modeled object, one or more functional scores of the respective 3D modeled object.

By "functional score" it is meant any indicator (e.g., a number, a vector) that is attributed to each object, and that measures an extent of non-respect of a respective functional descriptor among one or more functional descriptors, by the mechanical part or the assembly of mechanical parts. By convention, a lower functional score may signify a better agreement to (or respect of) the respective functional descriptor.

By "functional descriptor" it is meant any functional attribute of the 3D modeled object, i.e., a feature which characterizes (i.e., represents) a physical functionality of the represented real-world object (the mechanical part or the assembly of mechanical parts). By physical functionality it is meant the quality (by the real-world object) of being functional, that is, the capability of the represented real-world object to perform or be able to perform in the way is supposed to within a physical context of use, i.e., its use or purpose. A physical functionality may be a physical property that the represented real-world object possesses and that may be influenced by a physical interaction. Such physical properties may include, for example, electrical conductivity, thermal conductivity, drag in a fluid environment, density, rigidity, elastic deformation, tenacity, resilience, of the represented real-world object. A physical interaction may be an interaction with another mechanical object or plurality of objects, or the presence of environmental stimuli that influences a physical property of the represented real-world object. An environmental stimulus may be any physical input (to the represented object) coming from at least part of the intended environment, for example, heat sources from the environment or an environment comprising fluid flows. The physical functionality may be a mechanical functionality. A mechanical functionality may be a property of a spatial structure and mechanical soundness, that the represented real-world object possesses and that may be influenced under a mechanical interaction. Properties of spatial structure and mechanical soundness of the represented object may include the connectedness of the components of the represented real-world object, the stability, durability of the represented real world object when in use or any affordance of the represented real-world object when subject to a mechanical interaction. Said mechanical interaction may include any mechanical interaction of the represented object with other mechanical objects and/or external mechanical stimuli. Examples of mechanical interaction of the represented object with other mechanical objects may include, collisions (including, e.g., any type of impact with other objects and/or any type of friction with other objects), contention of another object within an enclosed volume, supporting another object, holding another object, or being hanged via a mechanical connection. Said mechanical interaction of the represented object may include mechanical constraints of motion on the represented object, for example, static or dynamic constraints of motion. Said mechanical interaction may further include any mechanical response of the represented object to external mechanical stimuli. An external mechanical stimulus may consist of the application of a mechanical force to the represented object, for example, the application of forces changing from a state of rest to a state of motion, stress forces or vibration forces. A functional descriptor may involve multiple physical or mechanical functionalities, which may be combined in a single dimensional descriptor or as a multi-dimensional vector.

Therefore, the functional scores quantify an extent to which the represented real world object possesses a physical functionality related to its use or purpose, as represented by a respective functional descriptor among one or more functional descriptors. Thus, the loss penalizes output 3D modeled objects that do not have good agreement with respect to the use or purpose characteristics of the represented real-world object. Therefore, the loss allows the learning to explore the mutual dependency between one or more physical and/or mechanical functionalities of the represented real-world object characterized by the one or more functional descriptors, e.g., the learning explores mutual dependency between geometry, structure and physical and/or mechanical interaction of the object within the intended context. Consequently, the generative model trained according to the training method outputs 3D modeled objects that are particularly accurate representations of the corresponding represented mechanical part or assembly of mechanical parts, in terms of its mechanical functionality, e.g., being geometrically sound, physically realizable and with an improved interaction quality with the intended context of use.

The loss may further include another term that penalizes, for each output respective 3D modeled object, a shape inconsistency of the respective 3D modeled object with respect to the dataset. By “shape inconsistency of the respective 3D modeled object with respect to the dataset” it is meant any disagreement or mismatch between geometry of the respective 3D modeled object and geometry of at least some elements of the dataset. The disagreement or mismatch may consist in a difference or distance (exact or approximate) between shape of the respective 3D modeled object and shape of the at least some elements of the dataset. Therefore, the learning may explore the mutual dependency between the functionality (as captured by penalizing the functional scores) and the geometry of the 3D modeled object, thus outputting accurate and realistic 3D modeled objects where the shape is best adapted with the functionality of the represented mechanical part or assembly of mechanical parts.

The other term may include a reconstruction loss, an adversarial loss, or a mapping distance. Therefore, the learning may focus on improving the consistency of the shape according to either the reconstruction loss, the adversarial loss or the mapping distance. The other term including the reconstruction loss between the respective 3D modeled object and a corresponding ground truth 3D modeled object of the dataset may consist of a term that penalizes a geometric dissimilarity between the respective 3D modeled object and the corresponding ground truth 3D modeled object of the dataset. Thus, a generative model trained according to the provided method may be used for an improved 3D shape reconstruction that respects the intended functionality. An adversarial loss relative to the dataset includes or consists of a term that minimizes a discrepancy between the distribution of the dataset and that of the generated 3D output modeled objects. Thus, the minimization of the discrepancy improves shape consistency of the generated 3D output objects with respect to the distribution of the dataset. The mapping distance measures a shape dissimilarity between the respective 3D modeled object and a corresponding modeled object of the dataset. Therefore, the generative model outputs 3D modeled objects wherein a 3D modeled object may be more accurate (at least in terms of its functionality and shape consistency) with respect to the corresponding modeled object of the dataset.

The deep-learning generative model may include a 3D generative network. By “3D generative neural network” it is meant a deep-learning generative model forming a neural network, the neural network trainable according to machine-learning-based optimization, and wherein all of the learnable elements of the neural network (e.g., all weights of the neural network) are trained together (e.g., during a single machine-learning-based optimization). Therefore, the deep learning generative model may leverage from such 3D generative neural networks for improving aspects of the accuracy of the output 3D modeled objects.

The 3D generative neural network may include a Variational Autoencoder or a Generative Adversarial Network (e.g., a classic Generative Adversarial Network, or a latent Generative Adversarial Network followed by a 3D converter). Such 3D generative neural networks improve the accuracy of the output 3D models.

A Variational Autoencoder is composed of two parts: an encoder and a decoder. The encoder takes an input and outputs a distribution probability. The decoder reconstructs the input given a sample from the distribution output by the encoder. For example, the distribution may be set to be Gaussian, such that the encoder outputs two vectors of a same size representing, e.g., the mean and variance of the distribution probability, and the decoder reconstructs the input based on the distribution. The Variational Autoencoder is trained by training jointly the encoder and decoder via a variational loss and a reconstruction loss.

A Generative Adversarial Network (henceforth called as well GAN) is composed of two networks: a generator and a discriminator. The generator takes as input a low-dimensional latent variable which is sampled from a Gaussian distribution. The output of the generator may be a sample of the same type as the data within the training dataset (e.g., classic GAN), or as the data within the latent space (e.g., latent GAN). The generator may be trained using a discriminator which is trained to perform binary classification on its input between two classes: “real” or “fake”. Its input must be classified as “real” if it comes from the training dataset and as “fake” if it comes from the generator. During the training stage, while the discriminator is trained to perform its binary classification task, the generator is trained to “fool” the discriminator by producing samples which are classified as “real” by the discriminator. To train both networks jointly, the GAN may be trained through an adversarial loss.

The 3D generative neural network may alternatively include one from 3D generative neural networks including, hybrid generative networks that can be built on the basis of the Variational Autoencoder and the Generative Adversarial Network.

The deep-learning generative model may consist of the 3D generative neural network. Thus, the learning method trains all of the elements of the 3D generative neural network during the machine-learning-based optimization.

In such a case, the 3D generative neural network may include a Variational Autoencoder, and the other term may include the reconstruction loss and a variational loss. Accordingly, the deep learning generative model trained according to the training method trains the encoder and decoder of Variational Autoencoder together while minimizing the functional score. The deep-learning generative model thus outputs functionally valid 3D modeled objects while leveraging on the advantages of a Variational Autoencoder. Such advantages include, for example, sampling and interpolating (or performing other type of arithmetic on latent space) two latent vector representations from the latent space and outputting a functional 3D modeled object based on said interpolation, thanks to the decoder trained according to the training method.

Alternative to a Variational Autoencoder, the 3D generative neural network may include a Generative Adversarial Network, and the other term may include the adversarial loss. The adversarial loss may be of any kind, e.g., a Discriminator Loss, a Mini-Max loss, Non-Saturating Loss. Accordingly, the deep-learning generative model outputs functionally valid 3D modeled objects while leveraging on the advantages of a Generative Adversarial Network.

The deep learning generative model trained according to the method may be used within a method for synthesizing 3D modeled objects (i.e., creating the 3D modeled object from scratch), which may subsequently be integrated as part of a design process, notably within a CAD process, thereby increasing ergonomics of the design process while the user of the CAD system is provided with an accurate and realistic 3D modeled object. The synthesizing may comprise obtaining a latent representation from a latent space of the trained 3D generative neural network and generating the 3D modeled object from the obtained latent representation. The latent representation for generating the 3D modeled object may be obtained from any kind of sampling from the latent space, for example, as the result of performing arithmetic operations, or interpolation between at least two sampled latent representations from latent space. In further examples, the latent representation may be obtained as a result of providing an input 3D modeled object to the deep learning generative model. Therefore, the deep learning generative model may output a 3D modeled object that has an improved functionality over the input 3D modeled object.

Alternative to the deep-learning generative model consisting of the 3D generative neural network, the deep-learning generative model may consist of a mapping model followed by the 3D generative neural network. In such a case, the 3D generative neural network may be pre-trained, the other term may include the mapping distance. In such an alternative, the 3D generative neural network may optionally include a Variational Autoencoder or a Generative Adversarial Network. The mapping model may be trained by means of the mapping distance penalizing the shape dissimilarity between each respective output 3D modeled object and a corresponding modeled object of the dataset. The corresponding modeled object of the dataset may have been sampled or corresponding to a provided 3D modeled object (and thus added to the dataset). The provided 3D modeled object may thus have been output from another generative model or as the result of a prior design process. Thus, the training method may explore the mutual dependency between the functionality and the shape of the 3D modeled objects to output 3D modeled objects with improved functionality. Therefore, the deep learning generative model focuses on providing particularly accurate output 3D modeled objects with improved functionality and shape consistency while leveraging on the generative advantages of 3D generative networks, e.g., synthesizing of 3D modeled objects from a latent space of the 3D generative neural network or it may output a 3D modeled objects with an improved functionality over a provided 3D modeled object that may already leverage on improvements due to, e.g., being part of a prior design process or being output by another generative model.

The deep learning generative model trained according to the method may output 3D modeled objects based on a corresponding 3D modeled object of the dataset, for example, based on a latent vector representation from the latent space of the 3D generative model. The latent vector representation may be computed, for example, by sampling a latent vector from the latent space of the deep learning generative model and outputting a 3D modeled object based on such latent vector. Alternatively, the latent representation may correspond to a 3D modeled object provided to the deep-learning generative model and projected (e.g., represented as a latent vector) into latent space. The mapping distance specifies the manner in which the deep learning generative model outputs the 3D modeled object based on the corresponding 3D modeled object of the dataset, by penalizing the shape dissimilarity between each respective output 3D modeled object and a corresponding modeled object of the dataset. In examples, the mapping distance penalizes such shape dissimilarity by penalizing a distance between the latent vector representation of the corresponding modeled object of the dataset and the latent vector representation result of applying the mapping model to the latent vector representation of the corresponding 3D modeled object of the dataset. The mapping model may be any neural network, for example, two fully connected layers, and therefore learnable according to machine learning techniques. In examples, the minimum (found thanks to the penalization of the mapping distance) thus corresponds to the latent vector closest to the latent vector representation of the corresponding 3D modeled object of the dataset. Accordingly, the deep learning generative model outputs the 3D modeled object with the best shape consistency, that is, it is the 3D modeled object corresponding to the latent vector found thanks to the penalization of the mapping distance. Thus, the deep-learning generative model outputs a 3D modeled object with an improved functionality and shape consistency with respect to the corresponding 3D modeled object of the dataset (which may have been sampled or obtained from a provided 3D object), resulting in a more accurate output 3D model object with respect to the corresponding 3D modeled object of the dataset, with optimized functionality (thanks to the functional loss) and improved shape consistency (thanks to the mapping distance).

The training may comprise computing, for each respective 3D modeled object, a functional score of the 3D modeled object, the computing being performed by applying to the 3D modeled object one or more among a deterministic function, a simulation-based engine or a deep-learning function. Therefore, the functional scores may populate a dataset of 3D modeled objects with functional annotations.

By "deterministic function" it is meant any function (including at least a set of computations) that provides an explicit deterministic theoretical model, i.e., it produces the same output from a given starting condition. This excludes notably any method consisting of probabilistic or stochastic components. The deterministic function evaluates the 3D object (e.g., provided as an input to the explicit deterministic theoretical model) and outputs at least a functional score corresponding to a functional descriptor.

By "simulation engine" it is meant any data structure that represents a series of computations, wherein at least part evaluates the interaction of the 3D object under a variety of interactions, as supported by the simulation engine (e.g., thanks to a physics engine). A simulation-based engine takes as input the 3D object and outputs as a functional score a quantity related to the simulation output. Thus, the simulation based engine evaluates the 3D object within a relevant context, that is tracking the 3D object behavior when subjected to a variety of expected interactions, e.g., the expected response of the mechanical part or assembly of mechanical parts under the action of gravity.

By "deep learning function" it is meant any data structure that represents a series of computations, wherein at least part comprises learning a functional score based on the dataset and may be least partly based on one or more among a deterministic function or the simulation based engine. Thus, a 3D object is fed to the deep learning function that predicts a functional score that may be used as an annotation for the 3D modeled object.

In the case wherein the computing is performed by the deep-learning function, the deep-learning function may have been trained on the basis of another dataset. The other dataset may include 3D objects each associated with a respective functional score. The respective functional score may have been computed by using one or more among a deterministic function, a simulation-based engine or a deep-learning function. Therefore, the method leverages the generated 3D objects patrimony using existing computer programs, characterized with very heterogeneous compliance with functional requirements.

The training method may therefore compute the functional scores leveraging on at least a deterministic function, a simulation engine and/or a deep-learning function, or a combination of such computational tools. In examples, the training may augment a dataset of 3D modeled objects with a functional validity for each 3D modeled object of the dataset, by using the computed functional scores as annotations.

Reference is made to FIG. 4, wherein it is provided examples of computational tools used for computing functional scores corresponding to specific categories of 3D modeled objects. The dataset provided at S10 may comprise 3D models objects of any combination of one or more of these specific categories, and the one or more functional scores at S20 may include for each specific category, one or more (e.g., all) the functional descriptors shown in the table, optionally computed as shown in the table.

The following papers are referred hereunder:

[10] Hongtao Wu & al. *Is That a Chair? Imagining Affordances Using Simulations of an Articulated Human Body*. ICRA 2020.

[11] Dule Shu & al. 3*D Design Using Generative Adversarial Networks and Physics-Based Validation.* 2019.

[12] Mihai Andries & al. *Automatic Generation of Object Shapes With Desired Affordances Using Voxel grid Representation.* 2019.

[13] Vladimir G. Kim & al. Shape2Pose: *Human-Centric Shape Analysis*. SIGGRAPH 2014.

In these examples, for the category of chairs, the computation tools consist of a deep-learning function to compute a connectivity loss, and simulation engines to compute a Physical Stability and Sitting Affordance descriptors. The one or more functional descriptors provided herein are just examples. In this example, the connectivity loss is referred to as "topological loss" as it is computed via topological priors, e.g., a loss incorporated in a deep-learning function as in paper [6]. Moreover, a simulation engine is used to compute the functional score corresponding to a physical stability descriptor by applying gravity forces to the object. In addition, a simulation engine as in paper [10] is used for computing the functional score corresponding to a sitting affordance descriptor. In these examples, for the category of airplanes, the functional score corresponding to the connectivity descriptor may be obtained using topological priors as above. Additionally, a score corresponding to a drag coefficient descriptor may be computed via a simulation engine performing a computational fluid dynamics simulation as in paper [11]. In these examples, for the category of pushcart vehicles, it may be further computed, among others, a functional score corresponding to a contain affordance, by means of a simulation engine as in paper [12]. In these examples, further categories of vehicles include bicycle objects, wherein it may be computed, among others, functional scores corresponding to a human support and/or pedal affordance. In this example, a functional energy such as the one used in paper [13] may be incorporated into a simulation engine to provide an affordance model which may be used to compute such descriptors by simulating the application of forces to the seat of the bicycle, corresponding to the force exerted by a human model, and as well a simulation of the dynamics of the bicycle under pedaling effects.

The one or more functional descriptors are now discussed.

The one or more functional descriptors may include a connectivity descriptor. By "connectivity descriptor" it is meant any variable (single dimensional or multi-dimensional) describing the number of connected components of the 3D modeled object. Therefore, the training method may focus on penalizing disconnected elements of the 3D model. Consequently, a deep-learning generative model trained according to the training method creates 3D modeled objects consisting of a single connected component. Thus, the resulting 3D object is more accurate as the resulting object is a single 3D modeled object without disconnected components, a functionality required notably in the design of mechanical parts, or assembly of mechanical parts.

The one or more functional descriptors may include one or more geometrical descriptors and/or one or more affordances. By "geometrical descriptor" it is meant any variable (single dimensional or multi-dimensional) representing the spatial structure of the 3D object. By "affordance" it is meant any variable (single dimensional or multi-dimensional) representing the interaction of the object within an intended context (i.e., any type of relation that provides cues on the use of the 3D object within a specific context). Therefore, the training method may focus on penalizing geometric aberrations. Consequently, a deep-learning generative model trained according to the training method provides geometrically sound 3D modeled objects, i.e., having a more accurate spatial structure and/or a better functionality in terms of the interaction of the 3D modeled object within its intended context.

The one or more geometrical descriptors may include one or more among a physical stability descriptor and/or a durability descriptor. The physical stability descriptor may represent, for a mechanical part or an assembly of mechanical parts, a stability of the mechanical part or the assembly of mechanical parts, e.g., a capability of the mechanical part or the assembly of mechanical parts to remain in equilibrium at a spatial position, under the application of gravity force only. Therefore, the learning method may focus on penalizing any deviation of the position mechanical part from the initial position under the application of gravity force. Accordingly, a deep-learning generative model trained according to the training method outputs 3D model objects that maintain mechanical stability under the action of gravity, as expected in the context of a 3D object representing a mechanical part or an assembly of mechanical parts.

In examples, the physical stability descriptor of the 3D object may be computed via a deterministic function, a simulation engine, or a deep-learning function. In such examples, the descriptor may correspond to the positions at the center of mass of the mechanical part or assembly of mechanical parts, and the response of the 3D object under the application of gravity forces would be recorded over a time interval at least at those positions. Therefore, a functional score measuring an extent of non-respect of the stability descriptor would be a difference between the initial and final spatial position of the center of mass over the time interval. The physical stability descriptor may be further used to define a functional loss such as:

$$f_{stability} = |p_{i_f} - p_{i_0}|,$$

wherein $(p_{i_f}, p_{i_0})$ represent a center of mass position p ranging from time $i_0$ to time $i_f$. The definition of the time interval could be defined, for example, over a discrete interval, a continuous interval, or the discretization of a time interval. Such a loss penalizes a movement of the center of mass under the action of gravity over a time interval.

The durability descriptor may represent, for a mechanical part or an assembly of mechanical parts, a capability of the mechanical part or the assembly of mechanical parts to withstand the application of gravity force and external mechanical forces. The external mechanical forces may correspond to forces applied at random positions and may perturb the positions by varying the mass times gravity at each of the random positions. The external mechanical forces may further correspond to forces that features some direct contact with another mechanical object including, e.g., any type of friction between the two objects. Therefore, the training method may focus on penalizing deviations in the spatial position of the 3D modeled object due to the perturbations. Consequently, a deep-learning generative model trained according to the training method outputs a 3D modeled object that provides a more accurate representation of a mechanical part or assembly of mechanical parts, that is subject to the application of gravity force and external mechanical forces, which may represent, for example stress forces or vibrational forces or any similar external mechanical perturbation.

In examples, the response of the 3D object may be computed via a deterministic function, a simulation engine, or a deep-learning function. In such examples, the durability descriptor may be the center of mass positions of the mechanical part or assembly of mechanical parts, wherein in addition it would be recorded the initial and final spatial positions of the object center of mass to evaluate the durability of the 3D modeled. The durability descriptor would thus be used to define a functional loss term that penalizes deviations from the spatial position of the center of mass. The durability descriptor may be used to define a functional loss term as:

$$f_{durability} = \sum_{k=1}^{M} \alpha^k \left| p_{i_f}^k - p_{i_0}^k \right|$$

Wherein α is an annealing coefficient, with center of mass positions $$p_{i_f}^k - p_{i_0}^k$$

and k being a user defined weight. The loss thus penalizes an object that fails to remain static under the perturbations. An object that remains static under perturbations is a desirable property in the context of a mechanical part or an assembly of mechanical parts.

The one or more affordances may include one or more among a support affordance descriptor, a drag coefficient descriptor, a contain affordance descriptor, a holding affordance descriptor, a hanging affordance descriptor. The support affordance descriptor may represent, for a mechanical part or an assembly of mechanical parts, a capability of the mechanical part or the assembly of mechanical parts to withstand the application of external mechanical forces only. Such a descriptor may be a position (e.g., a top position) of the mechanical part or assembly of mechanical parts, and it can be recorded, e.g., by a simulation engine or explicit theoretical model wherein it is applied one or more forces on the top of the mechanical part or assembly of mechanical parts. The drag coefficient descriptor may represent, for a mechanical part or an assembly of mechanical parts, an influence of a fluid environment on the mechanical part or the assembly of mechanical parts. The descriptor may be a drag coefficient, i.e., a dimensionless quantity used to represent drag or resistance of the 3D modeled object in a fluid environment, as commonly known in the field of fluid dynamics. Such descriptor may be computed, e.g., via a simulation engine performing a computational fluid dynamics simulation. The contain affordance descriptor may represent, for a mechanical part or an assembly of mechanical parts, a response of the mechanical part or the assembly of mechanical parts while containing another object in an inside volume of the mechanical part. Such descriptor may be computed, e.g., via a simulation engine. The holding affordance descriptor may represent, for a mechanical part or an assembly of mechanical parts, the capability of the mechanical part or the assembly of mechanical parts to support another object via a mechanical connection. Such descriptor may be defined at the position wherein the mechanical connection is located. The hanging affordance descriptor may represent, for a mechanical part or an assembly of mechanical parts, the capability of the mechanical part or the assembly of mechanical parts for being supported through a mechanical connection.

Each 3D modeled object of the dataset may represent a piece of furniture, a motorized vehicle, a non-motorized vehicle or a tool. The deep learning generative model trained according to the method thus provides a more accurate representation of the specified class of objects of the dataset. The learning may use any loss that penalizes a combination of functional scores, for example, by penalizing a combination of one or more among the connectivity descriptor, the one or more geometrical descriptors or the one or more affordances. The class of furniture may have as functional descriptors at least a connectivity descriptor, a physical stability descriptor and one of a sitting affordance or an object support affordance. The class of motorized vehicles may have as functional descriptors at least a connectivity descriptor and a drag coefficient descriptor. The class of tools may have as functional descriptors at least a connectivity descriptor, a durability descriptor and one of a holding affordance or an object support affordance.

The training method can combine one or more functional scores of each descriptor, in accordance with the intended context of the outputted 3D modeled object. Reference is made to FIG. 4, providing examples of the computation of functional scores for the object categories of Chairs, Tables, Airplanes, Beds, Push Carts and Bicycles. Therefore, as illustrated by the examples, the training method considers the mutual dependency of geometric, structural, topological, physical and functional features of the 3D modeled object so that the output 3D modeled objects are accurate, therefore the generated content achieves its purpose and can be physically fabricated and brought into the real world.

Examples are now discussed with reference to FIGS. 5-7.

Figure 5:
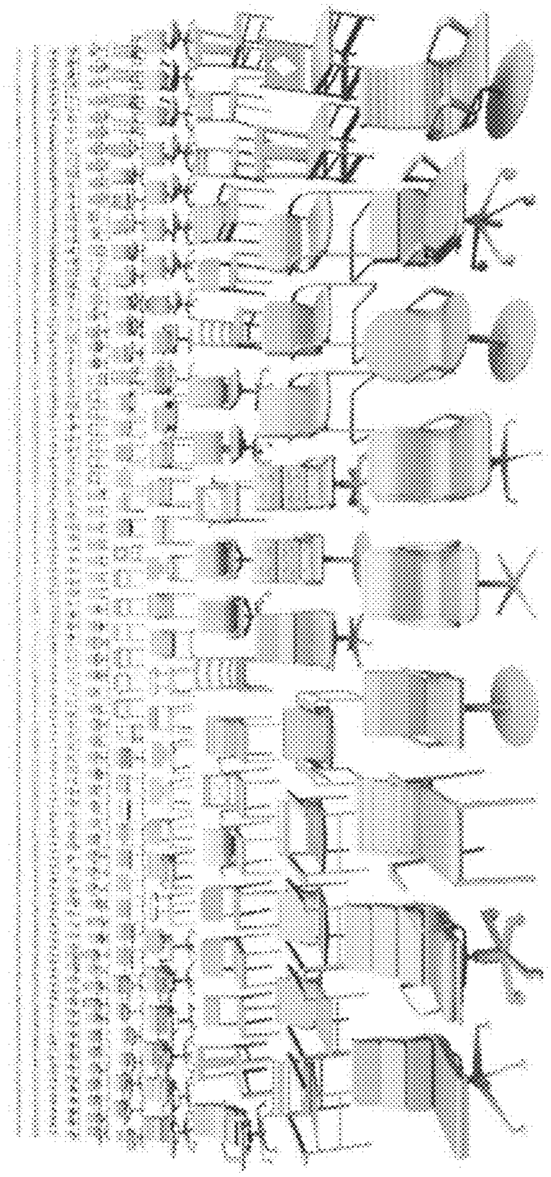

FIG. 5 shows an example of the synthesization of multiple 3D modeled objects in the particular category of chairs by the deep-learning generative model trained according to the training method.

Figure 6:
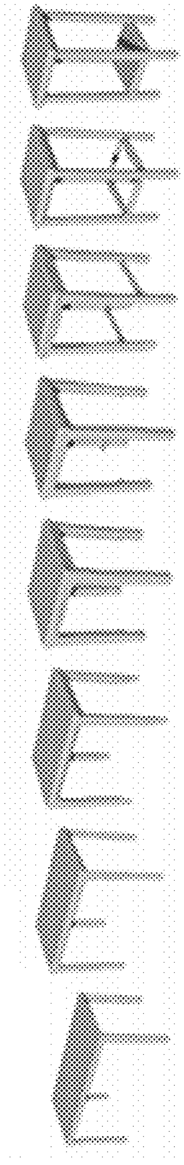

FIG. 6 shows the synthesization of 3D modeled objects of the category of tables wherein the deep learning generative model consists of a Variational Autoencoder and trained according to the training method. Two latent vector representations are sampled and outputted, shown in the left and right extremes of FIG. 6. The 3D modeled objects in the middle correspond to interpolations of the two sampled latent vector representations. This example shows how the deep-learning generative model trained according to the method leverages the existing 3D objects that are automatically synthesized using state of the art generative networks (in form of the Variational Autoencoder in this example) and outputs functionally valid 3D modeled objects.

Figure 7:
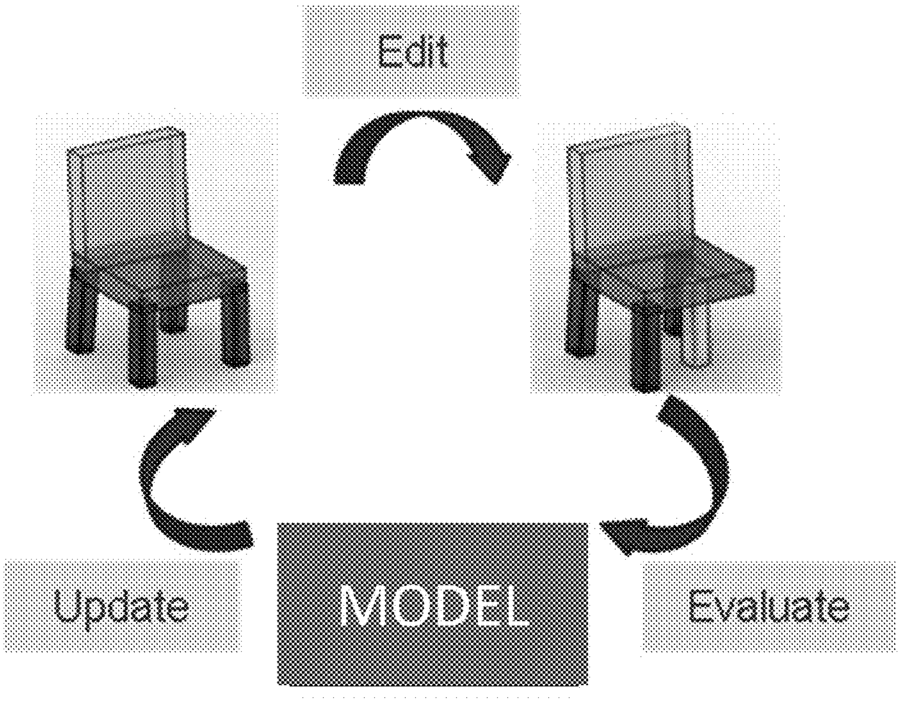

FIG. 7 shows an example of the incorporation of the deep-learning generative model within a design process, notably in a CAD environment. The deep learning generative model trained may map the input modeled object to an output 3D modeled object (evaluate and update) and the subsequent design (edit) is performed on said output 3D modeled object.

Examples are now discussed with reference to FIGS. 8-16.

In these examples, each 3D modeled object of the dataset represents a piece of furniture, in particular a chair. In other words, the training method and the method of use are applied to the category of "chairs". The 3D data representation consists of structured point cloud objects. In other words, each 3D modeled object is a point cloud.

The following examples further relate to the computation of functional descriptors and scores in the specific category of chairs, which are a class of furniture objects, computing connectivity, stability, durability and sitting affordance descriptors. The functional descriptors are to be used to generate structured point cloud objects representing the category.

Figure 8:
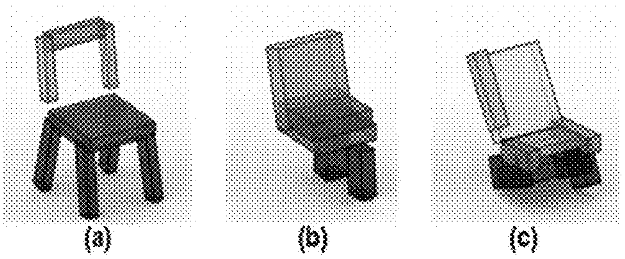

Connectivity descriptor: Within the category of chairs, connectivity encourages that there are no floating segments of the object. With reference to FIG. 8, (a) shows an object that violates the connectivity descriptor. Given the category, having a connected object corresponds to having one connected component.

In these examples, to assess point cloud connectivity, the method of paper [6] is used for computing connected and disconnected components of the 3D modeled object, using 0d persistent homology. According to the method of paper [6], a "Persistence Diagram" may be computed showing when topological features (connected components) appear (birth time $b_i$) and disappear (death time $d_i$).

In these examples, the connectivity loss is defined as $$f_{connectivity} = \sum_{i=1}^{\infty} |d_i - b_i|^2$$

This loss function sums over lifetimes beginning with i=1. Hence the loss penalizes disconnected components.

Stability descriptor: the 3D object is input to a simulation engine [8] simulating the stability of an object in the chair category. The simulation engine evaluates the stability of 3D object by evaluating if it remains static when subjected to gravity once placed on flat plane in the common orientation. Accordingly, the simulation records its center of mass positions $p_i$ when subject to gravity for i ranging from $i_0=0$ to $i_{2s}=2.5$ seconds with a simulation step of $2.510^{-4}$ seconds. The corresponding functional loss is:

$$f_{stability} = |p_{i_f} - p_{i_0}|$$

Figure 9:
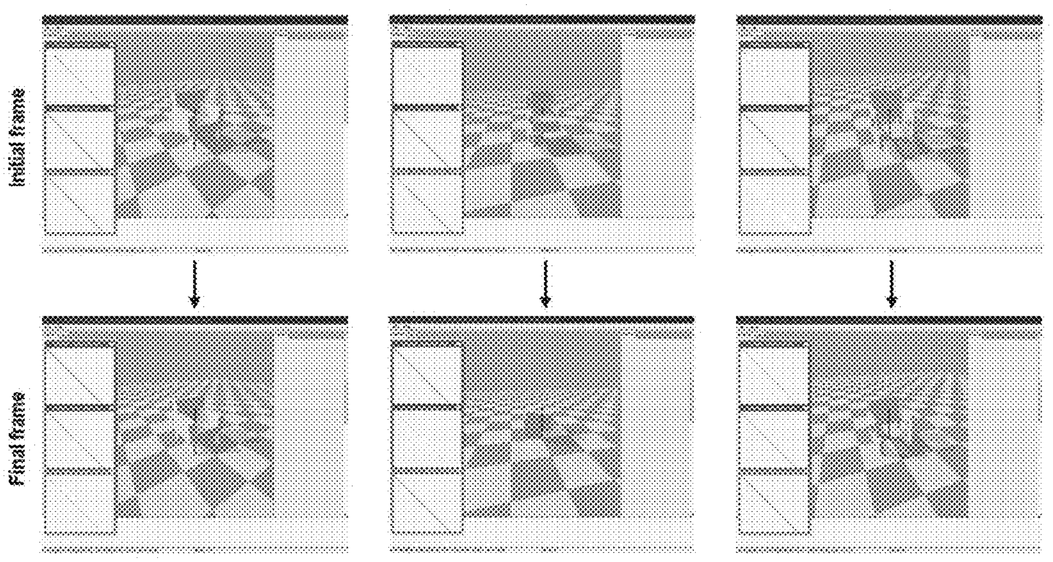

With reference to FIG. 8, (b) shows an object that violates stability descriptor. FIG. 9 illustrates example simulations showing the initial and final frames of simulations of the category of chairs. The top side shows the initial frame and the lower side shows the final frame, with initial time of 0 and final time of 2.5 seconds. The top and bottom frames in the middle of FIG. 9 show an unstable object (high $f_{stability}$)/ the top and top and bottom frames at the sides show stable objects (small $f_{stability}$).

Durability descriptor: ensures that the chair remains stable when subjected to small perturbations. With reference to FIG. 8, (c) shows an object of the category of chairs that violates durability descriptor. In this example, the perturbation force tends to rotate the object in the x-y (horizontal) plane. The force is applied in random positions and has 10 different norms k*0.01 times the object mass times gravity norm, for k ranging from 1 to M. The object behavior is simulated for each perturbation and the initial and final position of object center of mass is recorded, respectively $$p_{i_f}^k \text{ and } p_{i_0}^k,$$

as described in the above paragraph. In this example, the functional loss is $$f_{durability} = \sum_{k=1}^{M} \alpha^k |p_{i_f}^k - p_{i_0}^k|$$

Where α is an annealing coefficient between 0 and 1 ensuring that the object of the category of chairs is more penalized if it fails to remain static under smaller perturbation. In the current example, α=0.9 and M=10.

The following example shows how to further combine functional descriptors. The descriptors $f_{stability}$ and $f_{durability}$ are now combined as:

$$f_{s+d} = f_{stability} + f_{durability} = \sum_{k=0}^{M} \alpha^k |p_{i_f}^k - p_{i_0}^k|$$

Figure 10:
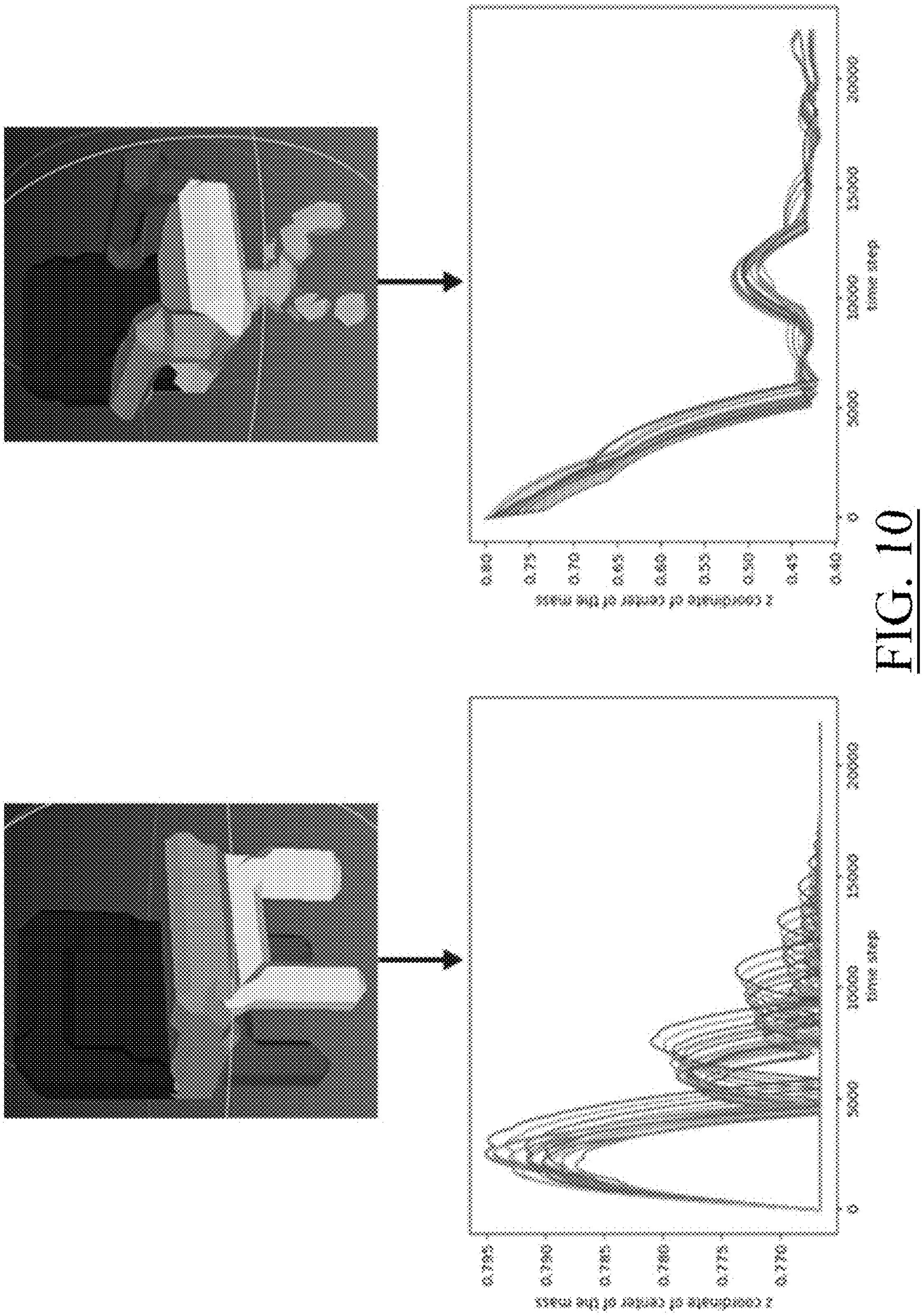

FIG. 10 shows recorded trajectories for different k values for two chairs. It may be interpreted from the trajectories in the bottom of FIG. 10 that the chair object on the left has a lower $f_{s+d}$ than the object on the right (i.e., it has a better functionality). The trajectories on the bottom left side show that the corresponding object on the upper left side remains static for k=0 when subject to gravity (blue horizontal curve) and recovers its initial position as a response to gravity and different small perturbations for k≥1. In contrast, the chair on the right side cannot recover its initial position as evidenced by the trajectories of the lower right side of FIG. 10.

In further examples, all of the three scores may be further combined as:

$$f_{physical} = f_{connectivity} + f_{stability} + f_{durability}.$$

Figure 11:
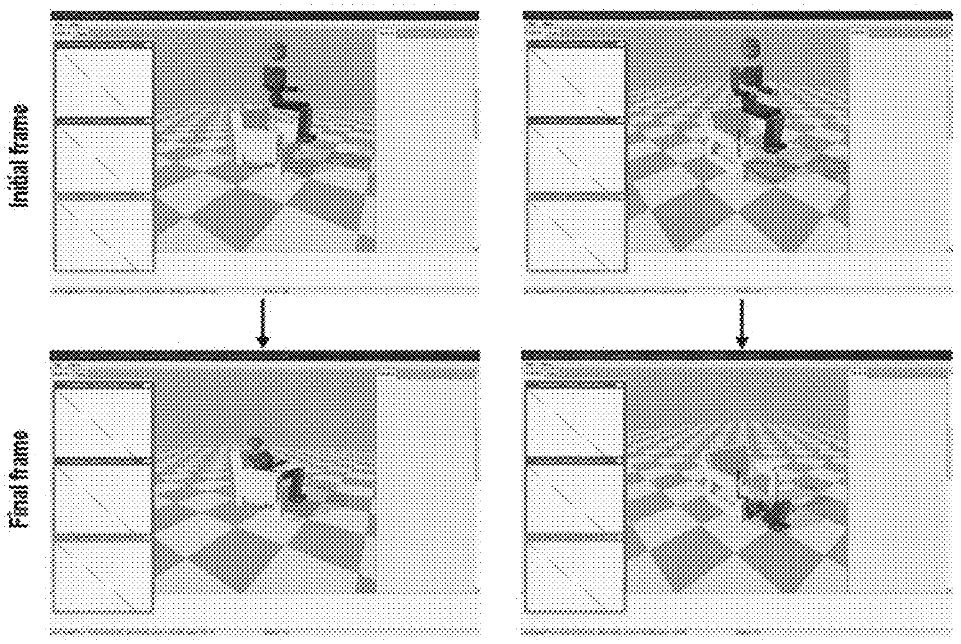

The following example discusses the computation of the functional scores for the training method wherein the loss includes the combination of the three functional scores $f_{physical}$ and additionally, a functional score $f_{affordance}$ measuring an extent of non-respect of a respective sitting affordance descriptor Reference is done to FIG. 11 to explain the computation of the functional scores. In this example, the two objects on the initial frames at the top both have score $f_{s+d} \approx 0$, thus remaining static under gravity. However, the chair on the right in FIG. 11 is clearly not functional, as it lacks the seat part, and should manifest a higher functional score compared to the chair on the left. Therefore, a simulation engine as in [8] is used to compute the functional scores for the sitting affordance descriptor, i.e., the simulation engine is used to assess how the object meets the sitting affordance requirements. In the simulation engine, it is provided a human agent as shown in FIG. 11 that can be freely dropped onto the object. The simulation engine evaluates the response of the chair category under the context of a human agent interaction. The human agent is an articulated human body consisting of 9 links with 18 joints. In this example, arms and feet are trimmed because they are not substantial in defining a sitting configuration. Appropriate limits, friction, and damping for each joint are set to avoid configurations which are not physiologically capable for a typical human. The agent's pelvis is placed on a horizontal plane of 15 cm above the current axis-aligned bounding box of the object. Each drop is a sitting trial. The agent's resultant configuration $C_{res}$ is recorded, which corresponds to a 24-dimensional vector containing the center of mass position (3-dim), the orientation (3-dim) and the joints angles (18-dim). It is provided a key $C_{key}$ sitting configuration that corresponds to the targeted positions as shown by the initial frame in FIG. 11. In this example, the sitting affordance score $f_{affordance}$ included in the loss is:

$$f_{affordance} = \|C_{res} - C_{key}\|_2.$$

The following example refers to an implementation of the deep-learning generative model trained according to the training method.

The implemented deep learning model takes as input a 3D object and outputs the functional scores $f_{physical}$ and $f_{affordance}$. To build the model, a database of $N=5.10^4$ chairs is generated by using 3D generative neural networks like the ones disclosed by Papers [9,10]. Specifically, given an object category, pre-trained 3D generative neural networks from the prior art are used to sample new content of this category as instructed by each of these papers. Typically, for a GAN based 3D generative neural network such as [8] that is trained to learn data distribution of the target object category, many vectors sampled are mapped from the learned distribution to a voxel grid as output using the model generator. Each of these outputs constitutes a new instance. For each chair object $O_i$, the functional scores $f_i$ are computed as described above. This creates a new labeled dataset $\{O_i, f_i\}_{1 \le i \le N}$. The functional predictor is trained to reduce the distance between this estimated vector $$f_i'$$

and the ground truth functional score $f_i$. The distance designates a loss function such as Euclidean distance.

In this example, the functional score is defined as $$f_i = f_{i,physical} + f_{i,affordance};$$

Figure 12:
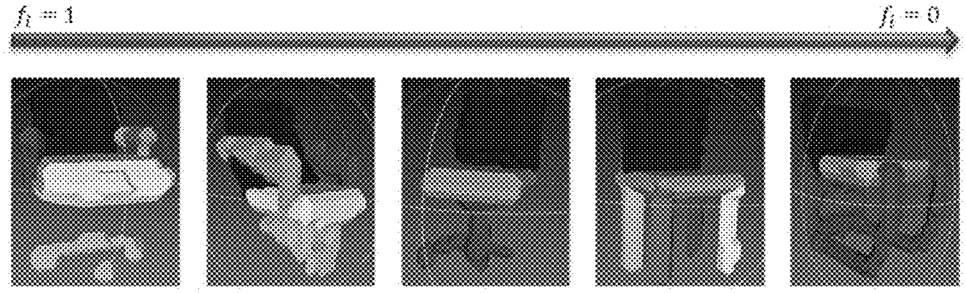

All scores are normalized between 0 and 1. FIG. 12 presents generated objects $O_i$ in a decreasing order of the corresponding $f_i$.

To train the deep-learning generative model, objects $\{O_i\}_{1 \le i \le N}$ are mapped to point clouds and use PointNet architecture as in Paper [9]. In this example, the training loss for functional predictor is:

$$L = \sum_{i=1}^{N} \|f_i - f_i'\|_2.$$

The following examples discusses methods of use of the deep-learning generative model. Hereunder, it is referred to as "functional predictor" to the part of the deep-learning generative model trained according to the training method that outputs the functional scores of a corresponding output 3D modeled object. In this example, the deep-learning generative model comprises a 3D generative neural network followed by the functional predictor. In this example, the 3D generative neural network corresponds to the PQ-Net decoder [8].

The PQ-Net decoder takes a latent vector from the learned latent space of objects and maps it to 3D object, one part at a time, resulting in a sequential assembly. The decoder performs shape generation by training a generator using GAN strategy as described in the paper [8]. The GAN generator maps random vectors sampled from the standard Gaussian distribution N(0,1) to a latent vector in the object latent space of objects; from which the sequential decoder generates new objects.

First method of use.

Figure 13:
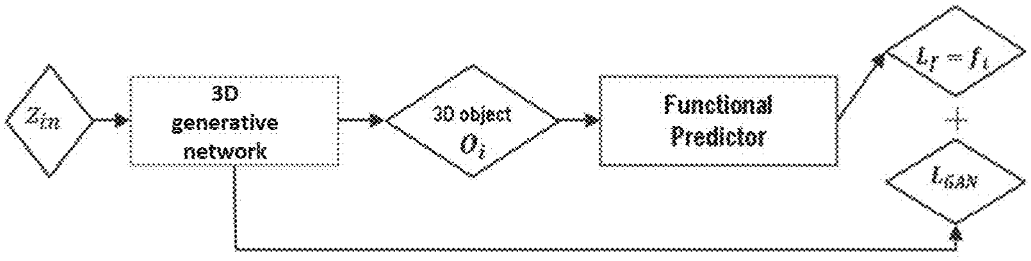

The first method of use is an example of an implementation of the deep-learning generative model, wherein the deep learning generative model consists of the 3D generative neural network, wherein the 3D generative neural network is a Generative Adversarial Network and the other term includes the adversarial loss. In this example, the 3D generative neural network is trained to map a latent vector into a 3D object while ensuring that the output content has a low functional score. FIG. 13 presents an overview of the first method of use. In FIG. 13, the functional predictor is pre-trained and the deep-learning generative model consists of the 3D generative network and it may be trained according to the training method. The deep-learning generative model architecture consists of a 3D generative neural network (PQ-Net decoder) followed by the functional predictor. During the training process the weights of the 3D generative neural network are learned while functional predictor weights are pre-learned as described above and frozen.

At each training iteration, a latent vector $z_{in}$ is sampled from the latent space and fed to the generator, the latter maps $z_{in}$ to a 3D object ($O_i$). The 3D object ($O_i$) is fed to the functional predictor that predicts its functional score $f_i$. The network is trained to generate geometrically plausible 3D object ($O_i$) while minimizing their functional score $f_i$. The model is hence endowed with functional reasoning. The latent representation includes jointly geometric (with structure here) and functional dimensions of 3D objects. The training loss includes a term that penalizes the functional score $L_f=f_i$ and an adversarial loss:

$$L_{Train} = L_f + L_{GAN}$$

The deep-learning generative model trained according to this method synthesizes new objects, as in FIG. 6.

Second Method of Use.

Figure 14:
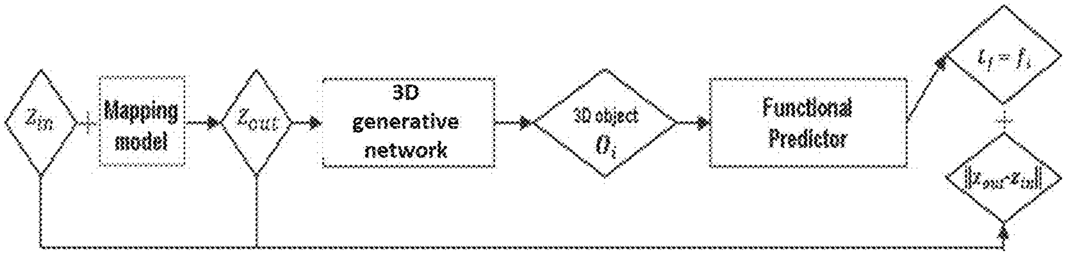

The second method of use shows an implementation wherein the deep-learning generative model consists in a mapping model followed by the 3D generative neural network, the 3D generative neural network being pre-trained, the other term including the mapping distance, the 3D generative neural network optionally being a Variational Autoencoder. An overview of the deep-learning generative model is described in FIG. 14. In FIG. 14, the 3D generative neural network is pre-trained and the functional predictor is included into the deep-learning generative model and pre-trained as well. Solely the mapping model shown in FIG. 4 is to be trained according to the method, the remaining boxes correspond to the pre-trained frozen networks. This method of use optimizes the functionality of the outputted 3D objects as explained hereunder. In this example, the deep-learning generative model consists of a pre-learned 3D generative neural network (PQ-Net decoder), a pre-learned functional predictor as described above, and a mapping model that consists of a neural network with two fully connected layers to be trained according to the training method. In this method of use, the deep-learning generative model uses a latent vector latent vector representation $z_{in}$ of the respective 3D object to optimize. The method of use optimizes the functionality of the 3D object by computing the closest latent vector $z_{out}$ to $z_{in}$ that minimizes the functional score. Therefore, the provided 3D object is mapped to a 3D object corresponding to the latent vector representation $z_{out}$ that has an improved functionality (that is, an object with low functional score). The mapping from $z_{in}$ to $z_{out}$ is achieved using the mapping model, which in this implementation consists of a neural network with two fully connected layers. The model overview is described in FIG. 14.

The mapping distance is thus used for training the mapping model. This includes minimizing a loss that includes the mapping distance and penalizes the functional score:

$$L_{map}(z_{out}) = \|z_{out} - z_{in}\|_2 + f_i.$$

The remaining models' weights (generative model and functional predictor) are frozen.

Figures 15, 16:
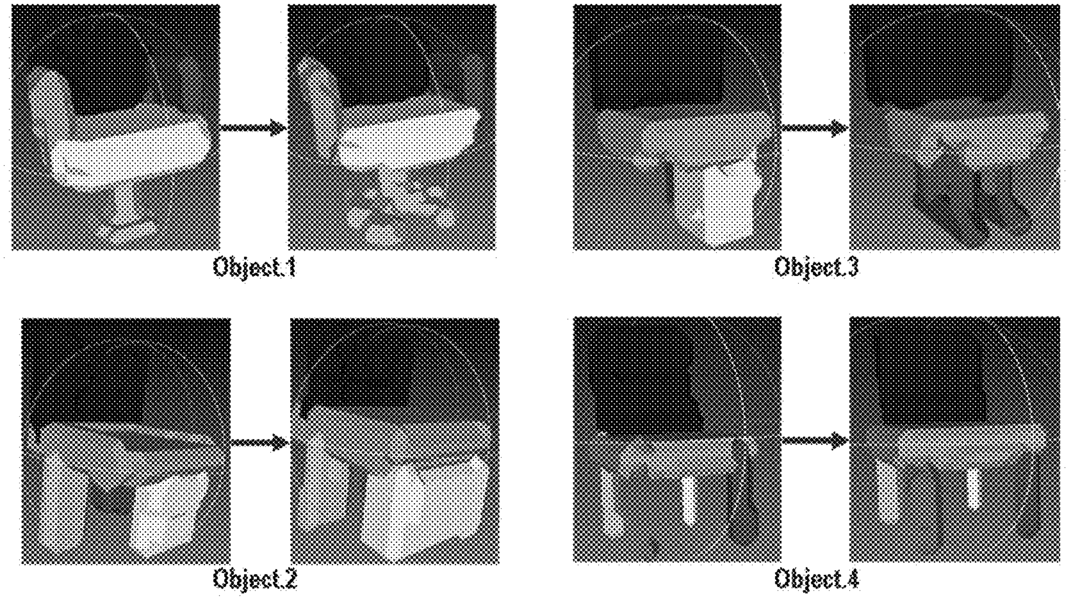

The network returns the optimal $z_{out}$ and the corresponding 3D object produced by the generative model. FIG. 15 presents examples of the optimization, showing pairs of objects in each corner. Each pair shows sampled objects prior to optimization on the left, and optimized output objects on the right. For example, object 4 in the lower right-hand corner shows a sample consisting of a chair with 3 legs and a fourth leg with defects. After optimization, the output figure shows a fourth leg without defects, therefore with an improved functionality. Numerical optimization results are given by FIG. 16, showing the improvements of the functionality of the output 3D modeled objects after the optimization.

The invention claimed is:

1. A computer-implemented method for training a deep-learning generative model that outputs 3D modeled objects each representing a mechanical part or an assembly of mechanical parts to be manufactured, the method comprising:

obtaining a dataset of 3D modeled objects, each 3D modeled object representing a mechanical part or an assembly of mechanical parts; and training the deep-learning generative model based on the dataset, the training including minimization of a loss, the loss including a term that penalizes, for each output respective 3D modeled object, one or more functional scores of the respective 3D modeled object, each functional score measuring an extent of non-respect of a respective functional descriptor among one or more functional descriptors, a lower functional score signifying a better respect of the respective functional descriptor, by the mechanical part or the assembly of mechanical parts, wherein the loss further includes a second term that penalizes, for each output respective 3D modeled object, a shape inconsistency of the respective 3D modeled object with respect to the dataset, wherein the second term includes:

a reconstruction loss between the respective 3D modeled object and a corresponding ground truth 3D modeled object of the dataset, an adversarial loss relative to the dataset, or a mapping distance measuring a shape dissimilarity between the respective 3D modeled object and a corresponding modeled object of the dataset, wherein the deep-learning generative model includes a 3D generative neural network, the 3D generative neural network being a neural network configured to generate and output one or more 3D objects, wherein the 3D generative neural network includes a Variational Autoencoder or a Generative Adversarial Network, wherein the one or more functional descriptors include a connectivity descriptor describing a number of connected components of the 3D modeled object, the reconstruction loss including a connectivity loss that penalizes disconnected elements of the 3D modeled object, the connectivity loss being based on Od persistent homology, and wherein the one or more functional descriptors also include:

one or more geometrical descriptors, each geometrical descriptor being a variable representing a spatial structure of the 3D object, the one or more geometrical descriptors including:

a physical stability descriptor, the physical stability descriptor represents, for a mechanical part or an assembly of mechanical parts, a stability of the mechanical part or the assembly of mechanical parts under an application of gravity force only, wherein the physical stability descriptor corresponds to a term:

$$f_{stability} = \left| p_{i_f} - p_{i_o} \right|,$$

wherein the pair $p_{i_f}$ denotes a center of mass position of the 3D object at a time $i_f$ and $p_{i_0}$ denotes a center of mass position at time $i_0$, and a durability descriptor, the durability descriptor represents, for a mechanical part or an assembly of mechanical parts, a capability of the mechanical part or the assembly of mechanical parts to withstand the application of gravity force and external mechanical forces, the durability descriptor corresponding to a term:

$$f_{durability} = \sum_{k=1}^{M} \alpha^k \left| p_{i_f}^k - p_{i_0}^k \right|,$$

wherein a is an annealing coefficient, the physical stability descriptor and the durability descriptor being combined as a term $$f_{s+d} = f_{stability} + f_{durability} = \sum\nolimits_{k=0}^{M} \alpha^k \left| p_{i_f}^k - p_{i_0}^k \right|,$$

and/or one or more affordances, each affordance being a variable representing an interaction of the object within an intended context, and wherein the training includes computing, for each respective 3D modeled object of the dataset, a functional score of the 3D modeled object, the computing being performed by applying to the 3D modeled object one or more among a deterministic function, a simulation-based engine, or a deep-learning function, and associating the computed functional score to the respective 3D modeled object of the dataset, thereby adding a functional annotation to the respective 3D modeled object in the dataset, the deep-learning generative model being configured for use in manufacturing.

2. The method of claim 1, wherein the computing is performed by the deep-learning function, the deep-learning function having been trained on a basis of another dataset, the other dataset including 3D objects each associated with a respective functional score, the respective functional score having been computed by using one or more among:

a deterministic function, a simulation-based engine, or a deep-learning function.

3. The method of claim 1, wherein:

the one or more affordances include:

a support affordance descriptor, the support affordance descriptor represents, for a mechanical part or an assembly of mechanical parts, a capability of the mechanical part or the assembly of mechanical parts to withstand an application of external mechanical forces only, and/or a drag coefficient descriptor, the drag coefficient descriptor represents, for a mechanical part or an assembly of mechanical parts, an influence of a fluid environment on the mechanical part or the assembly of mechanical parts, a contain affordance descriptor, the contain affordance descriptor represents, for a mechanical part or an assembly of mechanical parts, a capability of the mechanical part or the assembly of mechanical parts to contain another object in an inside volume of the mechanical part or the assembly of mechanical parts, a holding affordance descriptor, the holding affordance descriptor represents, for a mechanical part or an assembly of mechanical parts, a capability of the mechanical part or the assembly of mechanical parts to support another object via a mechanical connection, and/or a hanging affordance descriptor, the hanging affordance descriptor represents, for a mechanical part or an assembly of mechanical parts, a capability of the mechanical part or the assembly of mechanical parts to be supported through a mechanical connection.

4. The method of claim 3, wherein each 3D modeled object of the dataset represents:

a piece of furniture, a motorized vehicle, a non-motorized vehicle, or a tool.

5. A device comprising:

a processor; and a non-transitory data storage medium having recorded thereon a deep-learning generative model that outputs 3D modeled objects each representing a mechanical part or an assembly of mechanical parts to be manufactured and that is taught by the processor being configured to:

obtain a dataset of 3D modeled objects, each 3D modeled object representing a mechanical part or an assembly of mechanical parts, and train the deep-learning generative model based on the dataset, the training including minimization of a loss, the loss including a term that penalizes, for each output respective 3D modeled object, one or more functional scores of the respective 3D modeled object, each functional score measuring an extent of non-respect of a respective functional descriptor among one or more functional descriptors, a lower functional score signifying a better respect of the respective functional descriptor, by the mechanical part or the assembly of mechanical parts, wherein the loss further includes a second term that penalizes, for each output respective 3D modeled object, a shape inconsistency of the respective 3D modeled object with respect to the dataset, wherein the second term includes:

a reconstruction loss between the respective 3D modeled object and a corresponding ground truth 3D modeled object of the dataset, an adversarial loss relative to the dataset, or a mapping distance measuring a shape dissimilarity between the respective 3D modeled object and a corresponding modeled object of the dataset, wherein the deep-learning generative model includes a 3D generative neural network, the 3D generative neural network being a neural network configured to generate and output one or more 3D objects, wherein the 3D generative neural network includes a Variational Autoencoder or a Generative Adversarial Network, wherein the one or more functional descriptors include a connectivity descriptor describing a number of connected components of the 3D modeled object, the reconstruction loss including a connectivity loss that penalizes disconnected elements of the 3D modeled object, the connectivity loss being based on 0d persistent homology, and wherein the one or more functional descriptors also include:

one or more geometrical descriptors, each geometrical descriptor being a variable representing a spatial structure of the 3D object, the one or more geometrical descriptors including:

a physical stability descriptor, the physical stability descriptor represents, for a mechanical part or an assembly of mechanical parts, a stability of the mechanical part or the assembly of mechanical parts under an application of gravity force only, wherein the physical stability descriptor corresponds to a term:

$$f_{stability} = \left|p_{i_f} - p_{i_0}\right|,$$

wherein the pair $p_{i_f}$ denotes a center of mass position of the 3D object at a time $i_f$ and $p_{i_0}$ denotes a center of mass position at time $i_0$, and a durability descriptor, the durability descriptor represents, for a mechanical part or an assembly of mechanical parts, a capability of the mechanical part or the assembly of mechanical parts to withstand the application of gravity force and external mechanical forces, the durability descriptor corresponding to a term:

$$f_{durability} = \sum_{k=1}^{M} \alpha^k \left|p_{i_f}^k - p_{i_0}^k\right|,$$

wherein a is an annealing coefficient, the physical stability descriptor and the durability descriptor being combined as a term $$f_{s+d} = f_{stability} + f_{durability} = \sum_{k=0}^{M} \alpha^k \left|p_{i_f}^k - p_{i_0}^k\right|,$$

one or more affordances, each affordance being a variable representing an interaction of the object within an intended context, and wherein the training includes computing, for each respective 3D modeled object of the dataset, a functional score of the 3D modeled object, the computing being performed by applying to the 3D modeled object one or more among a deterministic function, a simulation-based engine, or a deep-learning function, and associating the computed functional score to the respective 3D modeled object of the dataset, thereby adding a functional annotation to the respective 3D modeled object in the dataset, the deep-learning generative model being configured for use in manufacturing.

6. The device of claim 5, wherein:

the one or more affordances include:

a support affordance descriptor, the support affordance descriptor represents, for a mechanical part or an assembly of mechanical parts, a capability of the mechanical part or the assembly of mechanical parts to withstand an application of external mechanical forces only, and/or a drag coefficient descriptor, the drag coefficient descriptor represents, for a mechanical part or an assembly of mechanical parts, an influence of a fluid environment on the mechanical part or the assembly of mechanical parts, a contain affordance descriptor, the contain affordance descriptor represents, for a mechanical part or an assembly of mechanical parts, a capability of the mechanical part or the assembly of mechanical parts to contain another object in an inside volume of the mechanical part or the assembly of mechanical parts, a holding affordance descriptor, the holding affordance descriptor represents, for a mechanical part or an assembly of mechanical parts, a capability of the mechanical part or the assembly of mechanical parts to support another object via a mechanical connection, and/or a hanging affordance descriptor, the hanging affordance descriptor represents, for a mechanical part or an assembly of mechanical parts, a capability of the mechanical part or the assembly of mechanical parts to be supported through a mechanical connection.

7. A device comprising:

a processor; and a non-transitory data storage medium having recorded thereon a computer program including instructions for training a deep-learning generative model that outputs 3D modeled objects each representing a mechanical part or an assembly of mechanical parts to be manufactured that when executed by the processor causes the processor to be configured to:

obtain a dataset of 3D modeled objects, each 3D modeled object representing a mechanical part or an assembly of mechanical parts, and train the deep-learning generative model based on the dataset, the training including minimization of a loss, the loss including a term that penalizes, for each output respective 3D modeled object, one or more functional scores of the respective 3D modeled object, each functional score measuring an extent of non-respect of a respective functional descriptor among one or more functional descriptors, a lower functional score signifying a better respect of the respective functional descriptor, by the mechanical part or the assembly of mechanical parts, wherein the loss further includes a second term that penalizes, for each output respective 3D modeled object, a shape inconsistency of the respective 3D modeled object with respect to the dataset, wherein the second term includes:

a reconstruction loss between the respective 3D modeled object and a corresponding ground truth 3D modeled object of the dataset, an adversarial loss relative to the dataset, or a mapping distance measuring a shape dissimilarity between the respective 3D modeled object and a corresponding modeled object of the dataset, wherein the deep-learning generative model includes a 3D generative neural network, the 3D generative neural network being a neural network configured to generate and output one or more 3D objects, wherein the 3D generative neural network includes a Variational Autoencoder or a Generative Adversarial Network, wherein the one or more functional descriptors include a connectivity descriptor describing a number of connected components of the 3D modeled object, the reconstruction loss including a connectivity loss that penalizes disconnected elements of the 3D modeled object, the connectivity loss being based on Od persistent homology, and wherein the one or more functional descriptors also include:

one or more geometrical descriptors, each geometrical descriptor being a variable representing a spatial structure of the 3D object, the one or more geometrical descriptors including:

a physical stability descriptor, the physical stability descriptor represents, for a mechanical part or an assembly of mechanical parts, a stability of the mechanical part or the assembly of mechanical parts under an application of gravity force only, wherein the physical stability descriptor corresponds to a term:

$$f_{stability} = \left|p_{i_f} - p_{i_0}\right|,$$

wherein the pair $p_{i_f}$ denotes a center of mass position of the 3D object at a time $i_f$ and $p_{i_0}$ denotes a center of mass position at time $i_0$, and a durability descriptor, the durability descriptor represents, for a mechanical part or an assembly of mechanical parts, a capability of the mechanical part or the assembly of mechanical parts to withstand the application of gravity force and external mechanical forces, the durability descriptor corresponding to a term:

$$f_{durability} = \sum_{k=1}^{M} \alpha^k \left|p_{i_f}^k - p_{i_0}^k\right|,$$

wherein α is an annealing coefficient, the physical stability descriptor and the durability descriptor being combined as a term $$f_{s+d} = f_{stability} + f_{durability} = \sum_{k=0}^{M} \alpha^k \left|p_{i_f}^k - p_{i_0}^k\right|,$$

and/or one or more affordances, each affordance being a variable representing an interaction of the object within an intended context, and wherein the training includes computing, for each respective 3D modeled object of the dataset, a functional score of the 3D modeled object, the computing being performed by applying to the 3D modeled object one or more among a deterministic function, a simulation-based engine, or a deep-learning function, and associating the computed functional score to the respective 3D modeled object of the dataset, thereby adding a functional annotation to the respective 3D modeled object in the dataset, the deep-learning generative model being configured for use in manufacturing.

8. A non-transitory computer readable medium having stored thereon a program that when executed by a computer causes the computer to implement the method according to claim 1.

9. A method of manufacturing comprising:

obtaining a deep-learning generative model having been trained to output 3D modeled objects each representing a mechanical part or an assembly of mechanical parts according to a computer-implemented method according to claim 1;

using the deep-learning generative model to output a 3D modeled object representing a mechanical part or an assembly of mechanical parts; and manufacturing the mechanical part or assembly of mechanical parts.

10. The method of claim 1, wherein the training evaluates a functional validity of each respective 3D modeled object of the dataset in a respective intended context, the functional validity comprising shape and/or structural soundness of the respective 3D modeled object and/or physical realizability and interaction quality of the respective 3D modeled object in the respective intended context.

11. A method, comprising:

providing an input 3D modeled object to a deep-learning generative model trained by training a deep-learning generative model that outputs 3D modeled objects each representing a mechanical part or an assembly of mechanical parts to be manufactured, the training including:

obtaining a dataset of 3D modeled objects, each 3D modeled object representing a mechanical part or an assembly of mechanical parts; and training the deep-learning generative model based on the dataset, the training including minimization of a loss, the loss including a term that penalizes, for each output respective 3D modeled object, one or more functional scores of the respective 3D modeled object, each functional score measuring an extent of non-respect of a respective functional descriptor among one or more functional descriptors, a lower functional score signifying a better respect of the respective functional descriptor, by the mechanical part or the assembly of mechanical parts, wherein the loss further includes another term that penalizes, for each output respective 3D modeled object, a shape inconsistency of the respective 3D modeled object with respect to the dataset, wherein the other term includes:

a reconstruction loss between the respective 3D modeled object and a corresponding ground truth 3D modeled object of the dataset, an adversarial loss relative to the dataset, or a mapping distance measuring a shape dissimilarity between the respective 3D modeled object and a corresponding modeled object of the dataset, wherein the deep-learning generative model includes a 3D generative neural network, the 3D generative neural network being a neural network configured to generate and output one or more 3D objects, wherein the 3D generative neural network includes a Variational Autoencoder or a Generative Adversarial Network, wherein the one or more functional descriptors include a connectivity descriptor describing a number of connected components of the 3D modeled object, the reconstruction loss including a connectivity loss that penalizes disconnected elements of the 3D modeled object, the connectivity loss being based on Od persistent homology, wherein the one or more functional descriptors also include:

one or more geometrical descriptors, each geometrical descriptor being a variable representing a spatial structure of the 3D object, the one or more geometrical descriptors including:

a physical stability descriptor, the physical stability descriptor represents, for a mechanical part or an assembly of mechanical parts, a stability of the mechanical part or the assembly of mechanical parts under an application of gravity force only, wherein the physical stability descriptor corresponds to a term:

$$f_{stability} = \left| p_{i_f} - p_{i_0} \right|,$$

wherein the pair $p_{i_f}$ denotes a center of mass position of the 3D object at a time $i_f$ and $p_{i_0}$ denotes a center of mass position at time $i_0$, and a durability descriptor, the durability descriptor represents, for a mechanical part or an assembly of mechanical parts, a capability of the mechanical part or the assembly of mechanical parts to withstand the application of gravity force and external mechanical forces, the durability descriptor corresponding to a term:

$$f_{durability} = \sum_{k=1}^{M} \alpha^k \left| p_{i_f}^k - p_{i_0}^k \right|,$$

wherein a is an annealing coefficient, the physical stability descriptor and the durability descriptor being combined as a term $$f_{s+d} = f_{stability} + f_{durability} = \sum_{k=0}^{M} \alpha^k \left| p_{i_f}^k - p_{i_0}^k \right|,$$

and/or one or more affordances, each affordance being a variable representing interaction of the object within an intended context, and wherein the training includes computing, for each respective 3D modeled object of the dataset, a functional score of the 3D modeled object, the computing being performed by applying to the 3D modeled object one or more among a deterministic function, a simulation-based engine, or a deep-learning function, and includes associating the computed functional score to the respective 3D modeled object of the dataset, thereby adding a functional annotation to the respective 3D modeled object in the dataset, the deep-learning generative model being configured for use in manufacturing, thereby obtaining a corresponding input latent vector representation; and computing the closest latent vector to the input latent vector representation that minimizes the functional score, and outputting a 3D modeled object representing a mechanical part or an assembly of mechanical parts from the computed closest latent vector, the mechanical part or assembly of mechanical parts represented by the output 3D modeled object thereby improving the functional score with respect to the mechanical part or assembly of mechanical parts represented by the input 3D modeled object.

* * * * *